(12) United States Patent
Kimiyama et al.

(10) Patent No.: US 9,002,969 B2
(45) Date of Patent: Apr. 7, 2015

(54) DISTRIBUTED MULTIMEDIA SERVER SYSTEM, MULTIMEDIA INFORMATION DISTRIBUTION METHOD, AND COMPUTER PRODUCT

(75) Inventors: Hiroyuki Kimiyama, Kodaira (JP); Tsuyoshi Ogura, Kokubunji (JP); Tetsuo Kawano, Nerima-ku (JP); Kenji Shimizu, Higashimurayama (JP); Mitsuru Maruyama, Musashino (JP); Takeshi Kugimoto, Nerima-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 631 days.

(21) Appl. No.: 11/632,943

(22) PCT Filed: May 18, 2006

(86) PCT No.: PCT/JP2006/009953
§ 371 (c)(1),
(2), (4) Date: Jan. 19, 2007

(87) PCT Pub. No.: WO2006/123747
PCT Pub. Date: Nov. 23, 2006

(65) Prior Publication Data
US 2008/0091789 A1  Apr. 17, 2008

(30) Foreign Application Priority Data
May 18, 2005 (JP) .................. 2005-145922

(51) Int. Cl.
*G06F 15/167* (2006.01)
*H04N 21/231* (2011.01)
(Continued)

(52) U.S. Cl.
CPC ....... *H04N 21/23103* (2013.01); *H04N 21/222* (2013.01); *H04N 21/232* (2013.01); *H04N 21/6581* (2013.01); *H04N 21/8456* (2013.01)

(58) Field of Classification Search
CPC .......................... H04L 29/08549; G06F 13/28
USPC ................................................ 709/212, 213
See application file for complete search history.

(56) References Cited

U.S. PATENT DOCUMENTS 4,949,243 A * 8/1990 Mohamed Ali et al. .......... 711/5
6,173,329 B1  1/2001 Sasaki et al.
(Continued)

FOREIGN PATENT DOCUMENTS

JP  3461278  8/2003
WO  01 71524  9/2001

OTHER PUBLICATIONS

Bonhomme et al. (Bonhomme, A. and Prylli, L., "Performance evaluation of a distributed video storage system", Proc. of Int. Parallel and Distributed Processing Symposium 2002, Apr. 2002, pp. 126 to 135).*

(Continued)

*Primary Examiner* — Dustin Nguyen
*Assistant Examiner* — Joel Mesa
(74) *Attorney, Agent, or Firm* — Oblon, McClelland, Maier & Neustadt, L.L.P.

(57) ABSTRACT

A distributed multimedia server system includes a buffer server module, a storage server module, and an intercluster connection network. Based on memory information on a buffer memory of the storage server module that stores divided multimedia information, the buffer server module obtains the divided multimedia information from the buffer memory using remote direct memory access. The storage server module reads the divided multimedia information requested from the buffer server module from a storage device, and stores the divided multimedia information in the buffer memory.

20 Claims, 22 Drawing Sheets

(51) Int. Cl.
*H04N 21/222* (2011.01)
*H04N 21/232* (2011.01)
*H04N 21/845* (2011.01)
*H04N 21/658* (2011.01)

(56) References Cited

U.S. PATENT DOCUMENTS

| | | | | |
|---|---|---|---|---|
| 2001/0049740 | A1* | 12/2001 | Karpoff | 709/231 |
| 2003/0132942 | A1* | 7/2003 | Obata et al. | 345/537 |
| 2003/0145230 | A1 | 7/2003 | Chiu et al. | |
| 2005/0193158 | A1* | 9/2005 | Srinivasan et al. | 710/300 |

OTHER PUBLICATIONS

Bonhome, et al.,"Performance Evaluation of a Distributed Video Storage System", Proceedings of the International Parallel and Distributed Processing Symposium, pp. 126-135, 2002.
Kawano, et al.,"Implementation and Evaluation of Uncompressed HDTV Over IP Transmission System", IEICE Technical Report, vol. 104, No. 181, pp. 13-18, 2004 (With English abstract).
Infiniband(SM) Trade Association, [online], [Search on, May 6, 2005], the Internet <http://infinibandta.org/events/past/it_roadshow/fabric_tco_ibm.pdf>.
Myrinet Overview, [online], [ Searched on May 6, 2005 ], the Internet http://www.myrinet.com/myrinet/overview/ pp. 1/3-3/3.
Tsukuba Advanced Computing Center, National Institute of Advanced Industrial Science and Technology, "AIST supercluster", [online], [Searched on May 6, 2005], the Internet http://unit.aist.go.ip/tacc/supercluster.html>,pp. 1/3-3/3. (With English translation).
Kimiyama, et al.,"PC-cluster Server Capable of Delivering Ten Uncompressed HDTV Streams Trough an IP Network", NTT Network Innovation Laboratories, pp. 3 and 797-800, 2005. (With partial English Translation).
Ogura, et al.,"An InfiniBand Based High-performance PC-cluster Stream Server Architecture", Technical report of IEICE, May 2005. (With English abstract and partial English translation).
Fukazawa, et al.,"Distributed Video Server Using New Striping Technique", NTT Human Interface Laboratories, vol. 3228, pp. 14-157, Feb. 1998.
Extended European Search Report issued Dec. 17, 2012, in Application No. / Patent No. 06746621.9-2223 / 1883240 PCT/JP2006309953.
Remote Direct Data Placement Work Group R. Recio IBM Corporation P. Culley,et al., "An RDMA Protocol Specification", draft-ietf-rddp-rdmap-04.txt, vol. rddp, No. 4, Apr. 22, 2005, XP015038875, 77pages.
Allyn Romanow, et al., "An Overview of RDMA over IP", Retrieved from the Internet: URL:www.datatag.web.cern.ch/datatag/pfldnet2003/papers/romanow.pdf, XP000962455, 2003, 22 pages.

* cited by examiner

DISTRIBUTED MULTIMEDIA SERVER SYSTEM, MULTIMEDIA INFORMATION DISTRIBUTION METHOD, AND COMPUTER PRODUCT

TECHNICAL FIELD

The present invention relates to a distributed multimedia server system capable of delivering multimedia information to each of a plurality of terminals without delay in response to a requests from the terminal or storing multimedia information transmitted from the terminals, a multimedia information distribution method, and a computer product.

BACKGROUND ART

For example, Patent Document 1 describes a conventional distributed multimedia server system. FIG. 1 is a schematic of such a conventional distributed multimedia server system. As shown in FIG. 1, a distributed multimedia server system 1 includes a communication server module 2, storage server modules 3 and 4, and a local area network 5.

Shown in FIG. 2 is a sequence in which multimedia information is stored. Upon receiving a write request and multimedia information from a terminal, the communication server module 2 divides the multimedia information, and transmits the write request to the storage server module 3. After receiving a response to the write request, the communication server module 2 transmits the divided multimedia information to the storage server module 3. Similarly, the communication server module 2 transmits information to the storage server module 4, and repeats the process.

Shown in Fig, 3 is a sequence in which multimedia info anon is distributed. Upon receiving a read request from a terminal, the communication server module 2 transmits a multimedia-information read request to the storage server module 3. Having received the read request, the storage server module 3 transmits requested multimedia information to the communication server module 2, The communication server module 2 receives the multimedia information, and transmits the multimedia information to the terminal through a distribution network. Similarly, the communication server module 2 transmits a multimedia-information read request to the storage server module 4. The storage server module 4 transmits requested multimedia info, information to the communication server module 2. The process is repeated.

Patent Document 1: Patent Publication No. 3461278

Non-patent Literature 1: INFINIBAND(SM) TRADE ASSOCIATION, [online], [Searched on 6 May, 2005], the Internet <http://infinibandta.org/events/past/it_roadshow/fabric_tco_ibm.pdf>

Non-patent Literature 2: Myrinet Overview, [online], [Searched on 6 May, 2005], the Internet <http://www.myrinet.com/myrinet/overview/>

Non-patent Literature 3: Tsukuba Advanced Computing Center, National Institute of Advanced Industrial Science and Technology, "AIST supercluster", [online], [Searched on 6 May, 2005], the Internet <http://unit.aist.go.jp/tacc/supercluster.html>

DISCLOSURE OF INVENTION

Problem to be Solved by the Invention

In the system shown in FIG. 1 that uses the local area network 5, Ethernet (registered trademark) is generally used as the local area network. Under such environment, reliability is a major concern in network communication, and TCP/IP needs to be used as a protocol for communication.

To increase versatility of the TCP/IP, general-purpose operating devices 6, 7, and 8 in each server module perform this process. It is known that when the number of connected terminals increases and the almost maximum bandwidths are used in the network, it is required to wait for a long time until network bandwidth becomes available, and load increases rapidly. These operating devices also need to process messages between the terminals, and read and write requests between the server modules, further increases the load. As a result, the processing delay increases, and a reading of multimedia information may not be completed within a required time. Consequently, processing load per one server module needs to be reduced, and the number of modules needs to be determined to provide a margin in their processing capacity, resulting in a larger facility than is necessary. Traffics from the servers are collided at a switch in the local area network, with a resultant occurrence of random transmission delay in the local area network. This transmission delay activates a TCP/IP redundancy detecting mechanism, with a resultant reduction in transmission speed in the local area network. Therefore, a distributed server system needs to be built up using a local area network and a server with a transfer speed sufficiently higher than that actually used.

As explained above, in the conventional system, a server and a network need to be designed to have some margin in the processing capacity. Therefore, processors of the highest speed need to be mounted and clustered together for the server that simultaneously distributes a plurality of high-definition videos such as high-vision videos through a network. As an internal network that connects between them, the one with a capacity of gigabits or more such as the gigabit Ethernet (registered trademark) has to be used. Consequently, the system becomes very expensive.

On the other hand, an intercluster connection network that constitutes a parallel computer is available as a network other than the local area network (for example, see Non-patent Literatures 1, 2, and 3). This intercluster connection network performs high speed communication at low load and low cost because security of communication is guaranteed by hardware. However, the intercluster connection network is designed to transmit and receive messages between the servers and to share memories, and does not have a function transferring a stream such as video data. The memory-share (remote direct memory access) function allows other servers to freely access the memories of servers that are connected by the intercluster connection network. Most of process is implemented by hardware of a network card, which enables data transfer without substantial load on a CPU of the servers. Through remote direct memory access, once an address of the other party is obtained, data can be transferred without the operation of the other party. For example, in the process using the TCP/IP, the other party needs to make a system call such as send ( ). However, through remote direct memory access, data can be transferred without requiring the other party to perform an additional process. With the use of this network, data can be transferred at low load, and a server system having a high transfer function can be configured using a low-cost server without introducing an expensive high-specification server system. Accordingly, the cost of the server and the internally-connected network can be reduced. It is therefore an object of the present invention to provide a method of transferring a stream using a network or a bus system with remote direct memory access capabilities, such as the intercluster connection network, and a low-cost system that distributes high-definition video at high speed.

Means for Solving Problem

FIG. 4 is a system configuration example for explaining a distributed multimedia system according to the present invention. While means for solving the above problems are explained below with reference to FIG. 4, this is for simplicity of explanation only. The present invention is not to be so limited, but is to be limited only as defined by the appended claims.

In the system configuration example shown in FIG. 4, a distributed multimedia server system 10 includes buffer server modules (first server modules) 21, 22, 23, . . . storage server modules (second server modules) 31, 32, 33 . . . storage devices 41, 42, 43, . . . and an intercluster connection network 51. Terminals 11 and 12 are connected to the distributed multimedia server system 10, via a distribution network 61. The intercluster connection network 51 between the buffer server modules 21, 22, 23, . . . and the storage server modules 31, 32, 33, . . . provides remote direct memory access operations. With remote direct memory access capabilities of the intercluster connection network 51, the buffer server modules 21, 22, 23, . . . and the storage server modules 31, 32, 33, . . . can mutually refer to contents of their memories, Reference numeral 52 represents a local area network that exchanges messages between the buffer server modules 21, 22, 23, . . . and the storage server modules 31, 32, 33, . . . . While the distributed multimedia server system 10 shown in FIG. 4 includes a plurality of buffer server modules, storage server modules and storage devices, the distributed multimedia server system 10 can include one each of them. Additionally, in FIG. 4, the local area network 52 is used to exchange messages; however, the intercluster connection network 51 can be used to exchange messages.

First, the buffer server module 21 receives a multimedia-information read request from the terminal 11 for reproduction. The buffer server module 21 transmits the multimedia-information read request to the storage server module 31 having the storage device 41 that stores multimedia information. Having received the message, the storage server module 31 reads the multimedia information into the own memory. In response to the multimedia-information read request, the storage server module 31 returns information on the memory that stores the multimedia information (memory address and its size, or memory address that stores information on the memory) to the buffer server module 21.

Upon receiving the response to the multimedia-information read request, the buffer server module 21 fetches the multimedia information through remote direct memory access based on the information included in the response indicating the memory of the storage server module 31 that stores the multimedia information. The buffer server module 21 packetizes the multimedia information to transmit it to the terminal or a terminal specified in the multimedia-information read request from the terminal.

Multimedia information is to be transmitted to a number of terminals with a plurality of the buffer server modules 21, 22, 23, . . . and the storage server modules 31, 32, 33, . . . as shown in FIG. 4. In this case, multimedia information is divided to be stored in a segment or frame unit in the storage devices 41, 42, 43, . . . that are connected to the storage server modules 31, 32, 33, . . . , respectively. The buffer server module sequentially transmits a read request to the storage server modules connected to the storage devices that store the multimedia information. The buffer server module receives information on memory from the storage server modules, and sequentially reads the multimedia information from the storage server modules based on the information. The buffer server module assembles the multimedia information, and transmits it to specified terminals. The time at which the buffer server module transmits a multimedia-information read request can be before reading of multimedia information from a storage server module one before by remote direct memory access.

To simultaneously read multimedia information for a plurality of terminals, other buffer server modules also transmit a multimedia-information read request to the respective storage server module, and read the information in a similar manner. In this case, when a plurality of buffer server modules simultaneously accesses the storage server modules, responses from the storage servers may be delayed due to conflicts among processes, resulting in the occurrence of underflow. However, if the transmission of the multimedia information is delayed by buffering the information in the buffer server modules, the response delay can be absorbed.

As a response to the multimedia-information read request, the storage server module can return information on the memory of the storage server module that stores the memory information and information (new write information) as to whether new information is written, instead of the information on the memory that stores the multimedia information. With this, the buffer server module can determine whether new information is written, and indirectly read the multimedia information from the memory that stores the multimedia information.

To reduce a response data amount, the buffer server module can obtain the memory information and the new-write memory information from the storage server module at activation of the system, so that the response to the multimedia-information read request need not include the information. Or, the buffer server module can transmit the first multimedia-information read request only based on the obtained new-write memory information. At a second time and thereafter, the buffer server module accesses the new-write information memory to determine whether new information is written. By doing so, the number of times of performing high-overhead communication can be reduced.

Another means for solving the above problems is explained below.

First, the buffer server module 21 receives a multimedia-information read request from the terminal 11 for reproduction. The buffer server module 21 transmits the multimedia-information read request to the storage server module 31 having the storage device 41 that stores multimedia information. Together with this request, information (memory information) on a memory secured in the buffer server module 21 to store multimedia information is also transmitted. Having received the multimedia-information read request, the storage server module 31 reads the multimedia information from the storage device 41 and writes it into the memory indicated by the memory information by remote direct memory access. The storage server module 31 transmits a response indicating the completion of the writing to the buffer server module 21. Upon receiving the response, the buffer server module 21 transmits the multimedia information to the specified terminal.

To reduce the number of times of performing high-load communication, the buffer server module 21 transmits a divided-multimedia-information read request including, in addition to the memory information, information (new-write memory information) on a memory (new-write information memory) that stores the new-write information as to whether new information is written. Upon receiving this request, the storage server module 31 reads multimedia information from the storage device 41 and writes it into the memory indicated by the memory information by remote direct memory access.

At the same time, the storage server module 31 writes information indicating that new multimedia information is written into the memory specified by the new-write memory information, and does not transmit a response. After transmitting the multimedia-information read request, the buffer server module 21 refers to the new-write information memory, and determines whether new multimedia information has been written. If new information has been written, the buffer server module 21 fetches the divided multimedia information through remote direct memory access, and transmits the information to the terminal.

The multimedia information transmitted from the terminal 11 is stored in the distributed multimedia server system 10 as follows. First, upon receiving a multimedia-information write request from the terminal 11, the buffer server module 21 transmits a divided-multimedia-information write request to the storage server module 31. In response to this request, the storage server module 31 transmits information on a buffer memory available for writing divided multimedia information to the buffer server module 21. Having received this response, the buffer server module 21 divides multimedia information received from the terminal 11 based on the information, and writes the divided multimedia information into the buffer memory by remote direct memory access. Having determined that the divided multimedia information has been written, the storage server module 31 writes the information into the storage device 41.

The information can also be stored in another manner as follows. Upon receiving a multimedia-information write request from the terminal 11, the buffer server module 21 transmits to the storage server module 31 a divided-multimedia-information write request including information on a buffer memory of the buffer server module 21 that stores the divide multimedia information. Having received this request, the storage server module 31 fetches the divided multimedia information through remote direct memory access based on the information on the buffer memory included in the request, and writes the divided multimedia information into the storage device 41.

According to the present invention, multimedia information can be transferred between buffer server modules and storage server modules without using high-load communication as far as possible. Therefore, high simultaneous distribution performance can be achieved with a small number of servers.

Effect of the Invention

According to the present invention, transfer of multimedia information based on high-load communication can be replaced by low-load remote direct memory access. As a result, high total throughput can be achieved at low system cost. Further, because of the low load, a high-level process such as compression and conversion of a format of multimedia information can be built into a server system. Thus, high value-added service can be offered in the system with less server resources.

EXPLANATIONS OF LETTERS OR NUMERALS

1. Distributed multimedia server system, 2. Communication server module, 3, 4. Storage server module, 5. Local area network, 6, 7, 8. Operating device, 10, 50. Distributed multimedia server system, 11, 12, 13. Terminal, 21, 22, 23. Buffer server module, 31, 32, 33. Storage server module, 41, 42, 43. Storage device, 51. Intercluster connection network, 52. Local area network, 61. Distribution network, 62. Load balancer, 91. New-write memory, 92. Update information, 93. Memory information, 94, 95, 96. Divided-multimedia-information buffer memory

BEST MODE(S) FOR CARRYING OUT THE INVENTION

The present invention is explained below with reference to exemplary embodiments.

Figure 5:
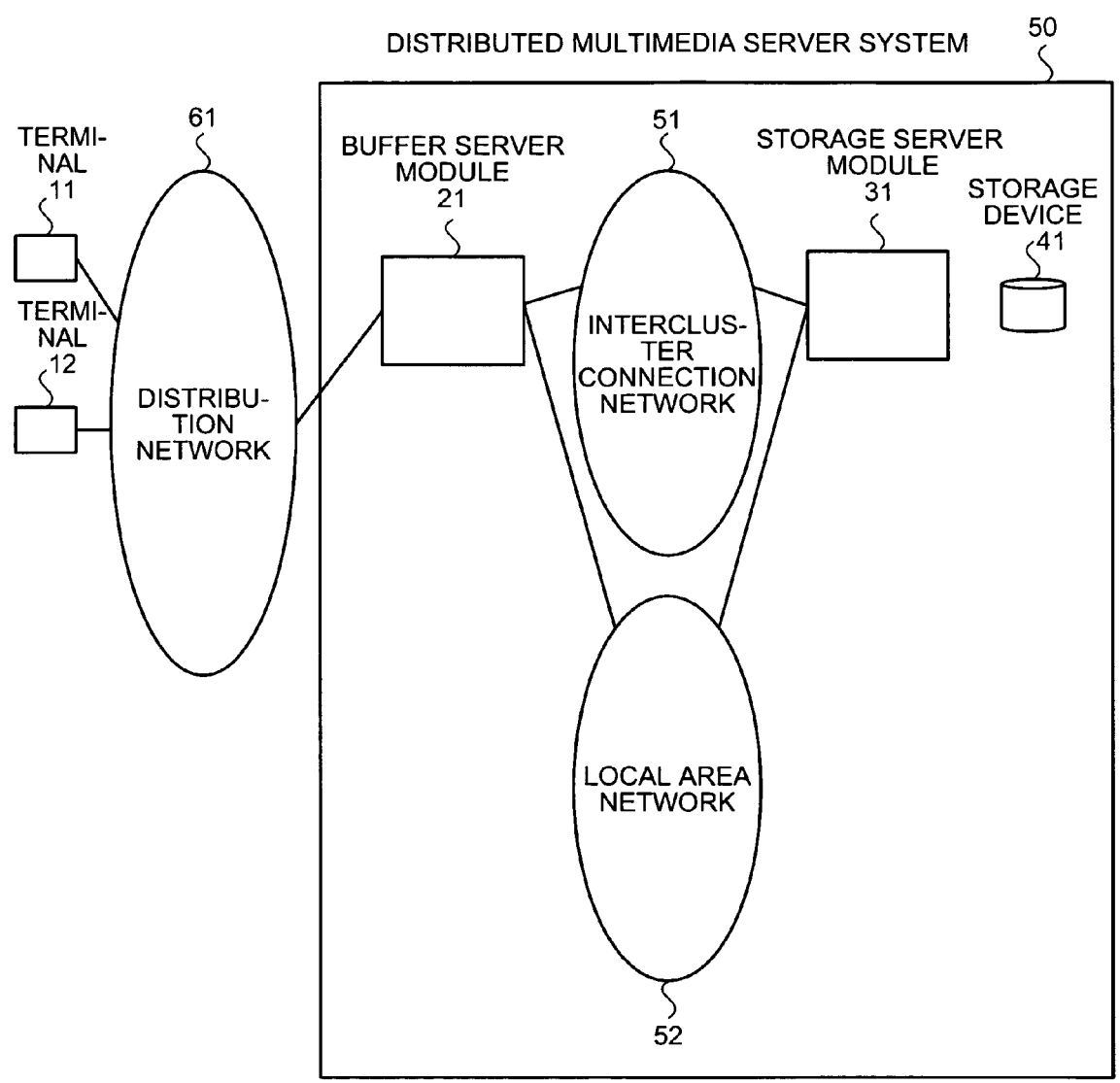
FIG. 5 is a configuration example (a minimum configuration) of a distributed multimedia server system according to an embodiment.

FIG. 5 is a configuration example (a minimum configuration) of a distributed multimedia server system 50 according to the present invention. Terminals 11 and 12 shown in the drawing are those operated by a user. A buffer server module 21 receives requests from the terminals 11 and 12, and transmits or receives multimedia information. A storage server module 31 includes a storage device 41 that divides and stores multimedia information. The storage server module 31 reads or writes multimedia information to and from this storage device. The buffer server module 21 and the storage server module 31 are connected to each other with a network or a bus system that can use remote direct memory access. In FIG. 5, an intercluster connection network 51 connects between the buffer server module 21 and the storage server module 31. The buffer server module 21 and the storage server module 31 can access data in their buffer memories by remote direct memory access. In the embodiment, an intercluster connection network for a parallel computer is intended to be used for the network 51. Therefore, the network 51 has a message communication function. However, when this intercluster connection network is not available, a local area network 52 as shown in FIG. 5 can be used to exchange messages such as a divided-multimedia-information read request and a response thereto, described later. In this case, the buffer server module 21 and the storage server module 31 are connected to each other via both the network 51 having remote direct memory access capabilities and the local area network 52 not having remote direct memory access capabilities. The terminals 11 and 12 are connected to the distributed multimedia server system 50 via a distribution network 61 such as a wide area network.

First, a process of transmitting information from the distributed multimedia server system to the terminal during reproduction is explained.

Figure 6:
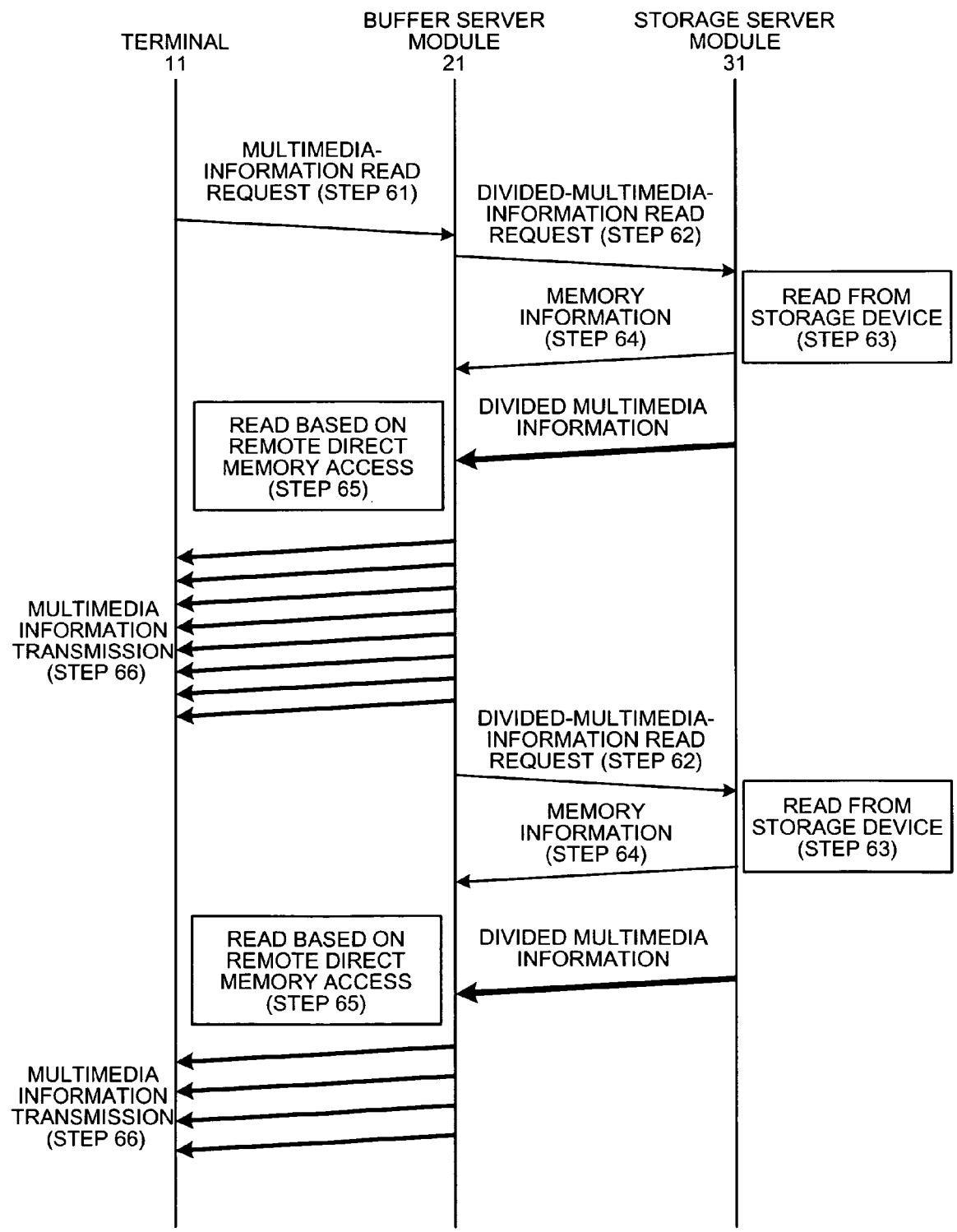
FIG. 6 is a schematic sequence diagram for explaining a first embodiment of a reproduction process.
Figure 7:
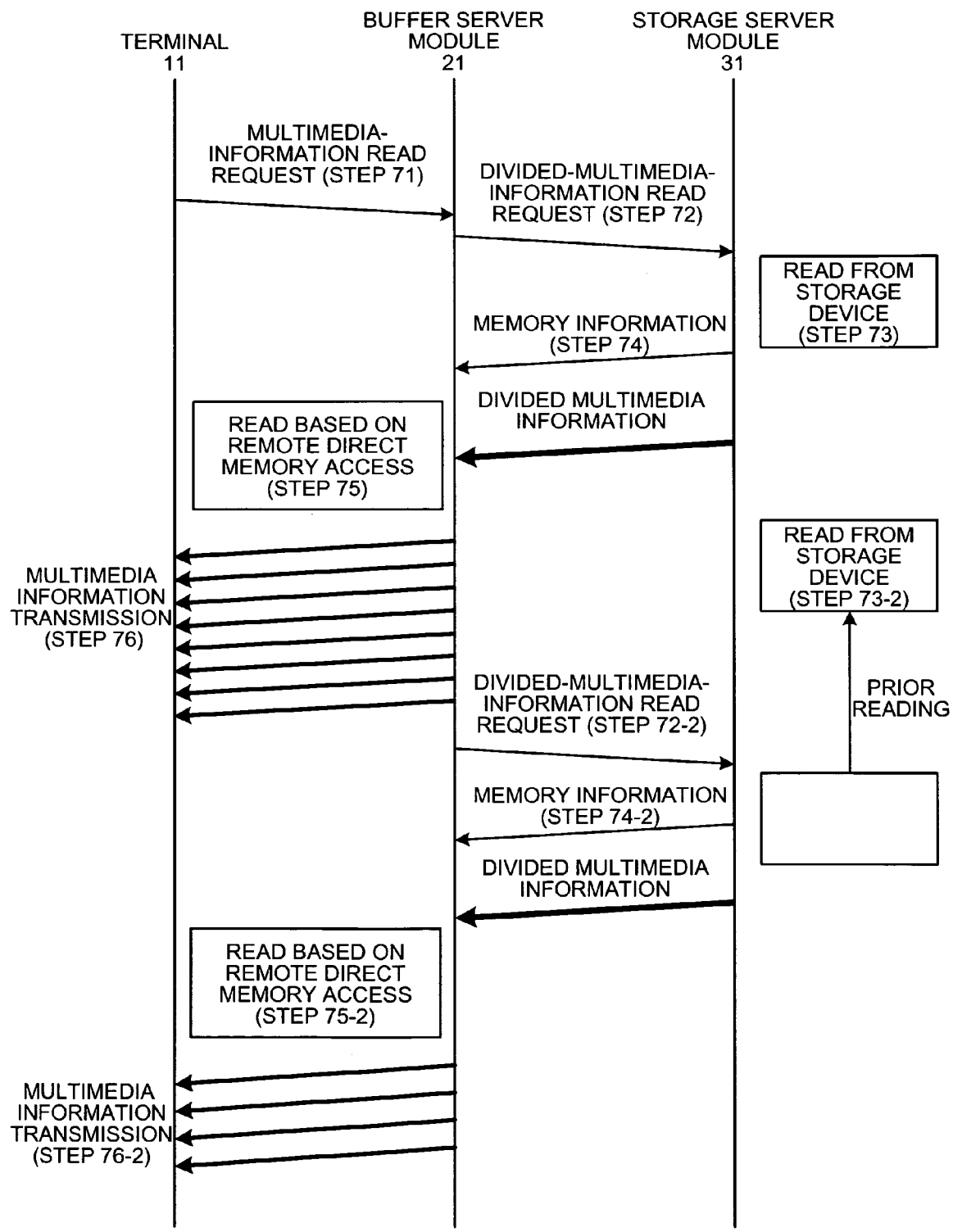
FIG. 7 is a schematic sequence diagram of the first embodiment of the reproduction process using a plurality of buffers.

FIG. 6 is a sequence diagram of a first embodiment of a read operation. In the drawing, thin arrows between the buffer server module 21 and the storage server module 31 represent message communication including TCP/IP, and thick arrows represent data transfer through remote direct memory access. A user transmits a multimedia-information read request from the terminal 11 to the buffer server module 21 to request multimedia information that the user wishes to obtain (step 61). In response to the request, the buffer server module 21 transmits a divided-multimedia-information read request to the storage server module 31 based on the received request (step 62). The storage server module 31 is connected to the storage device 41 that stores the requested multimedia information in a divided manner. Having received the request, the storage server module 31 reads corresponding divided multimedia information from the storage device 41 into a buffer memory of the storage server module 31 (step 63), and returns as a response information (memory information) on the buffer memory such as the address of the buffer memory and size of data therein (step 64). Based on this information, the buffer server module 21 fetches the divided multimedia information from the storage server module 31 through remote direct memory access (step 65), and transmits the divided multimedia information to a terminal specified by the multimedia-information read request via the network (step 66). Needless to mention, the transmission destination can be the terminal 11 that has first transmitted the multimedia-information read request. The process at steps 62 to 66 is repeated to transfer all the requested multimedia information. With a plurality of buffer memories in the storage server module 31, divided multimedia information to be transmitted next can be read in advance (step 73-2) and stored in the buffer memory as shown in FIG. 7, which allows an efficient process between the buffer server module 21 and the storage server module 31.

Figure 20:
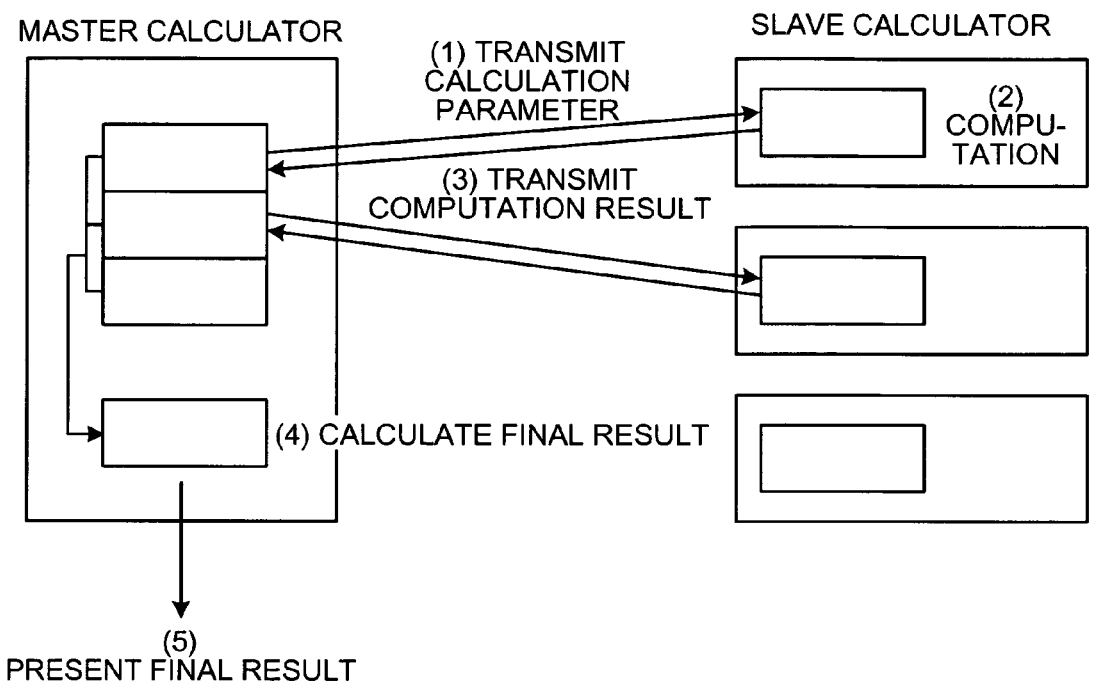
FIG. 20 is an explanatory diagram of a general cluster parallel computing system.

A general method of parallel computation performed by a cluster computer that uses the intercluster connection network is explained with reference to FIG. 20.

As shown in the drawing, the cluster computer performs a parallel computation in the following manner. First, a master calculator transmits parameters necessary for the parallel computation to each slave calculator using a message transmission and reception function (see (1) in FIG. 20). Each slave calculator receives the parameters, and performs parallel computation (see (2) in FIG. 20). On completion of the parallel computation, each slave calculator transmits a result of the computation to the master calculator using the message transmission and reception function, or writes the result into the master calculator using a memory sharing function (see (3) in FIG. 20). The master calculator that has received the computation result from each slave calculator or has been written with the result performs a calculation to obtain a final result (see (4) in FIG. 20), and presents the final result (see (5) in FIG. 20).

As explained above, in the general parallel computation performed by the cluster computer using the intercluster connection network, the master calculator exchanges minimum necessary information with the slave calculator using a predetermined memory area. Once a memory area to be used is determined at the start of the computation, information is simply written into the determined area thereafter.

Figure 1:
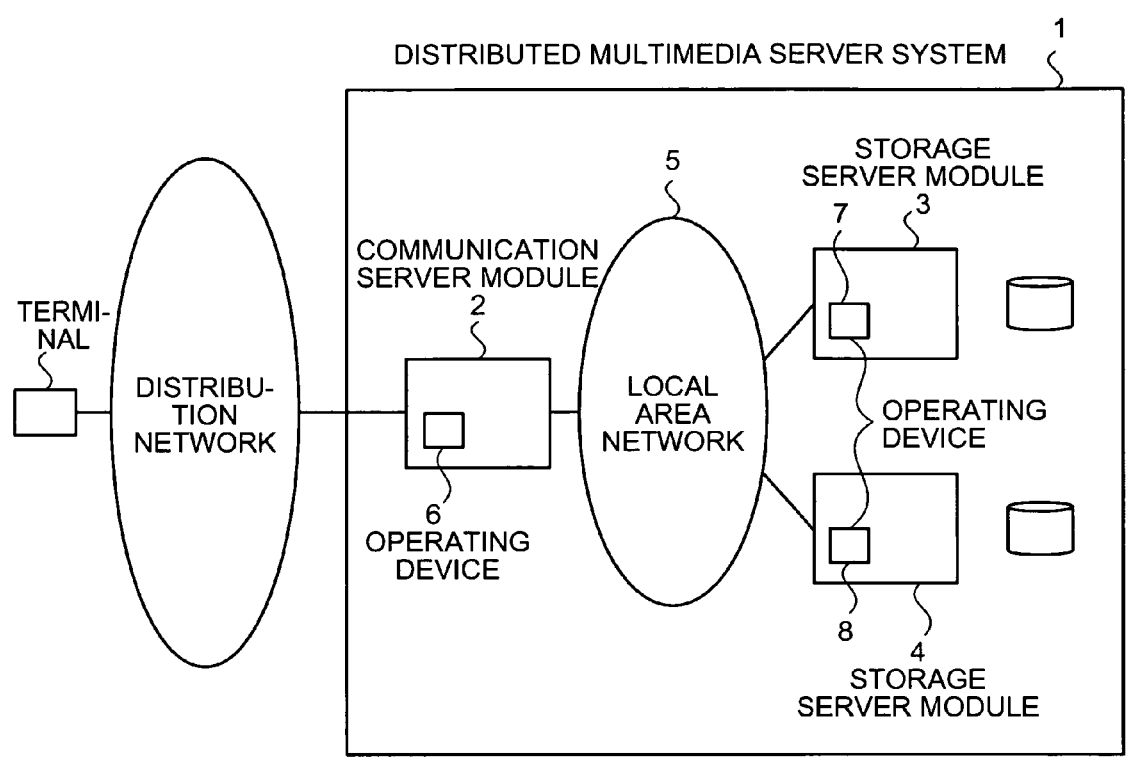
FIG. 1 is a configuration example of a conventional distributed multimedia server system.
Figure 2:
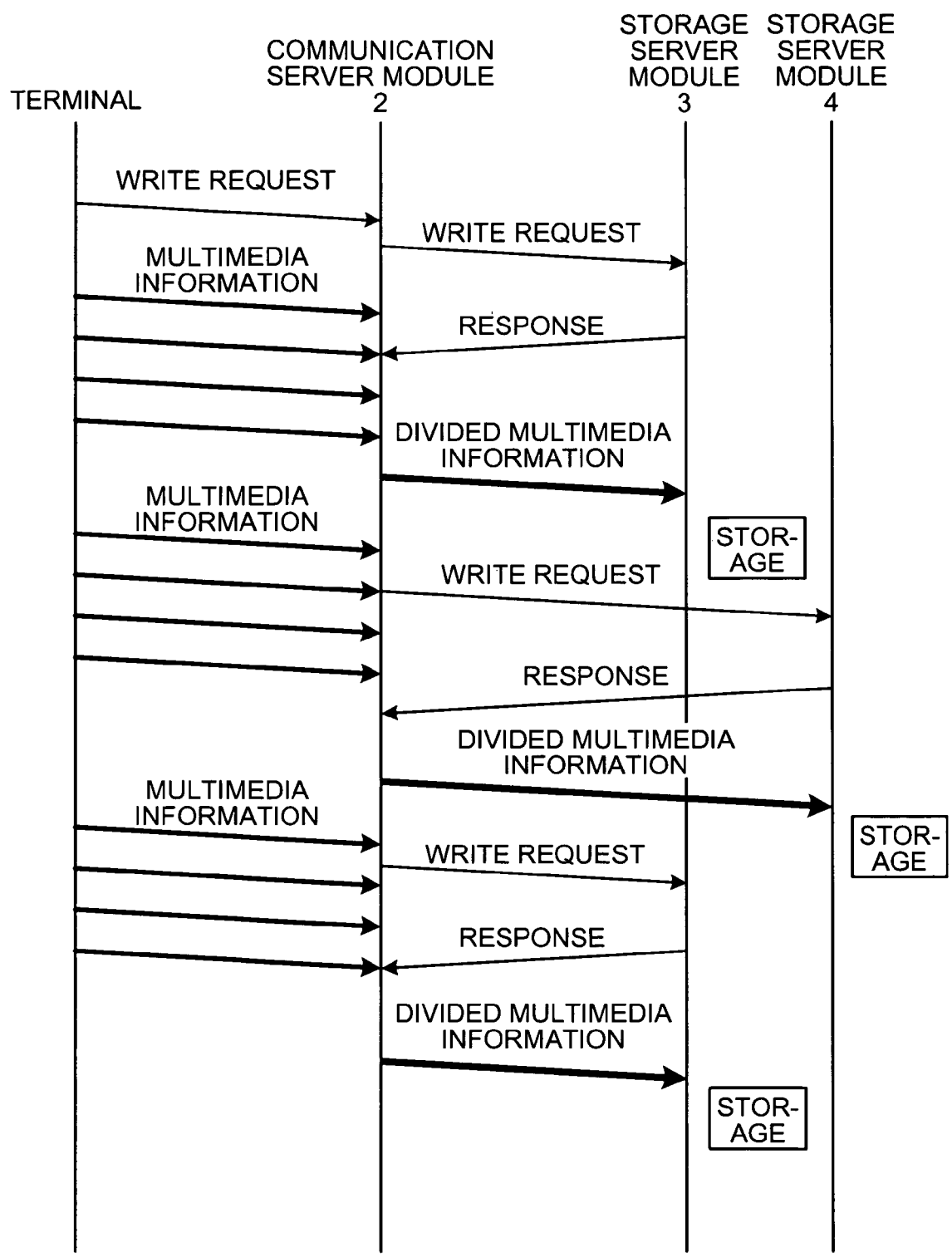
FIG. 2 is an example of a storage sequence in the conventional distributed multimedia server system.
Figure 3:
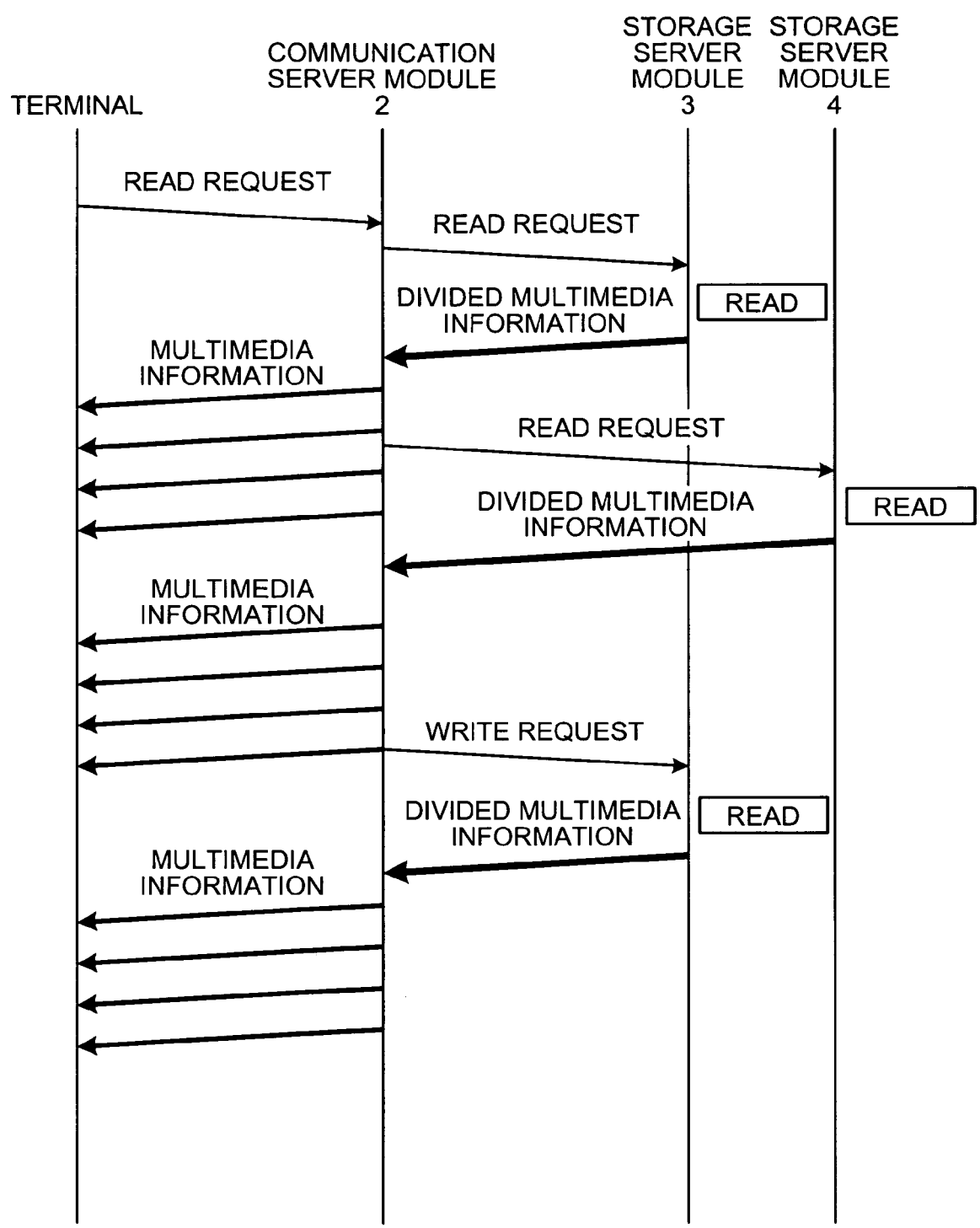
FIG. 3 is an example of a reproduction sequence in the conventional distributed multimedia server system.
Figure 4:
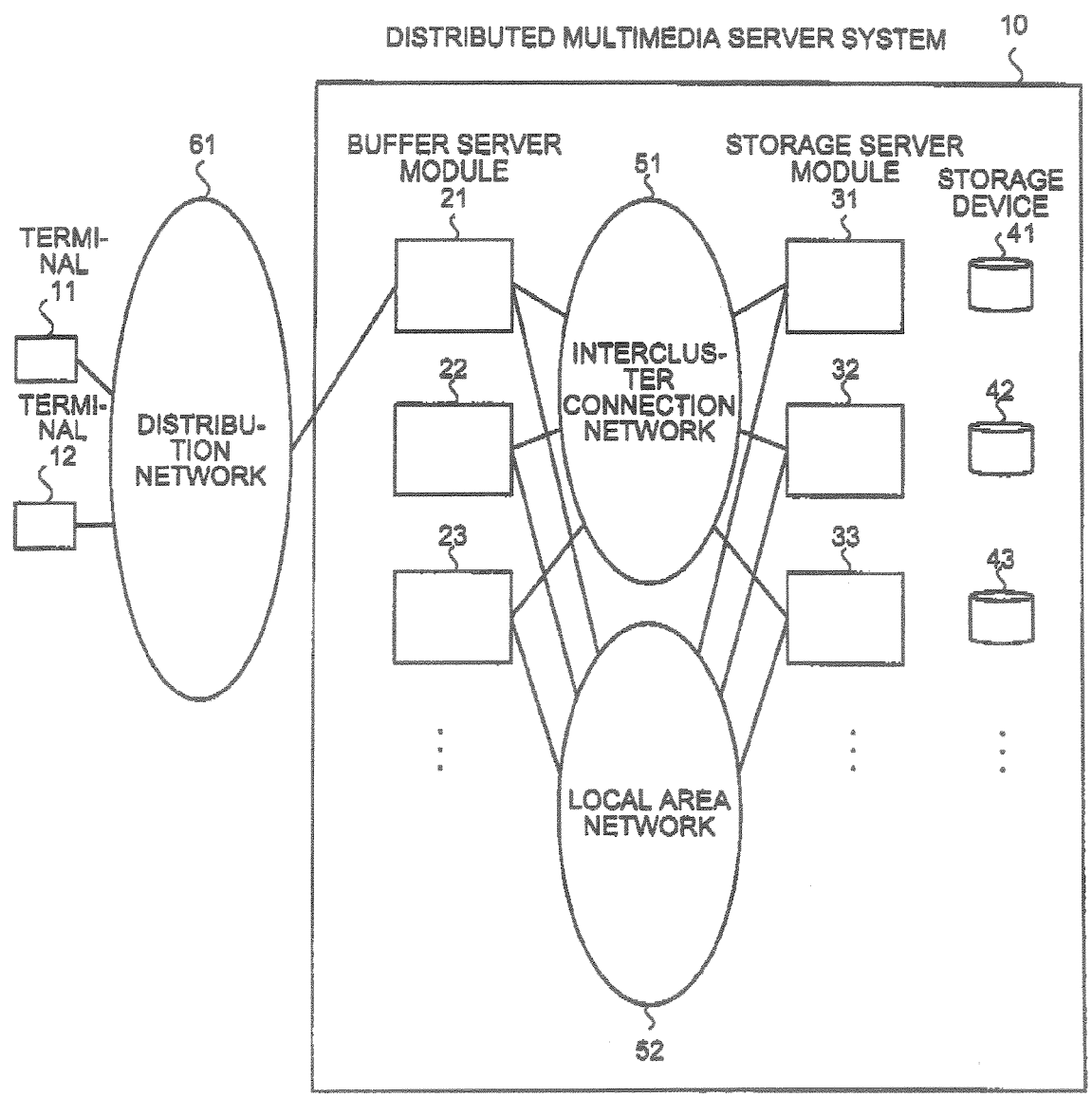
FIG. 4 is a configuration example for explaining a distributed multimedia server system according to the present invention.

On the other hand, in the conventional distributed-multimedia server system (see FIG. 1, for example), each server module uses a large amount of memory to transmit and receive a large volume of data at high speed during a short time, and the amount of memory to be used varies depending on a rate of data stream transmitted and received (data amount per unit time). Therefore, memory areas that are not used need to be positively released for efficient use of the memory to dynamically secure a memory area according to each request.

Figure 21:
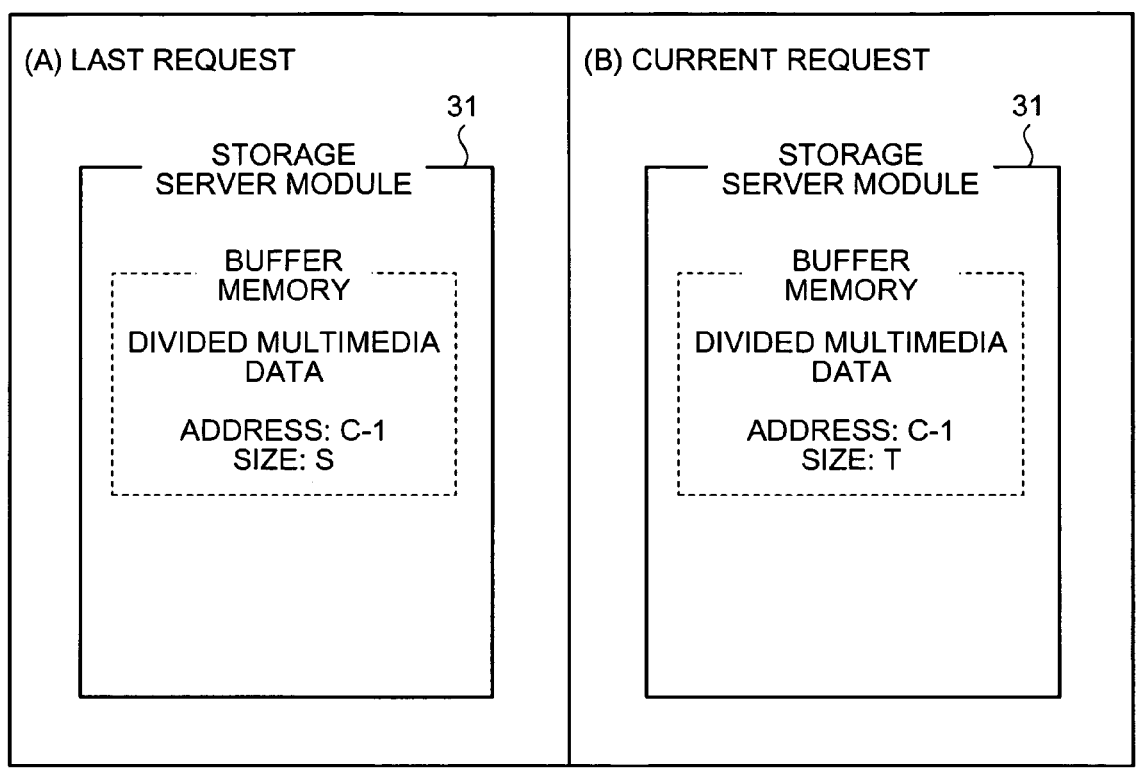
FIG. 21 is an example of buffer memory secured in response to a request.

According to the first embodiment of the present invention, as shown in FIG. 21, a buffer memory area (size: S) that is secured in response to the last request and a buffer memory area (size: T) that is secured in response to a request this time are different in the storage server module 31. In other words, a buffer memory area is dynamically secured according to each request.

In the conventional distributed-multimedia server system (see FIG. 1, for example), the processing time required to write or read divided multimedia information to or from the storage that is connected to each of the storage server modules 3 and 4 is not constant, and changes substantially depending on a physical position of the information in the storage. The storage server module 4 and the communication server module 2 communicate with each other after completion of reading or writing. Therefore, a transfer speed of divided multimedia information between the storage server module 4 and the storage, that between the storage server module 4 and the communication server module 2, and that between the communication server module and the terminal are different when these are observed for a short time, although the same when observed for a long period. To absorb the speed difference, a plurality of memory areas need to be prepared in each server module, and data storage location needs to be reported periodically.

Figure 22:
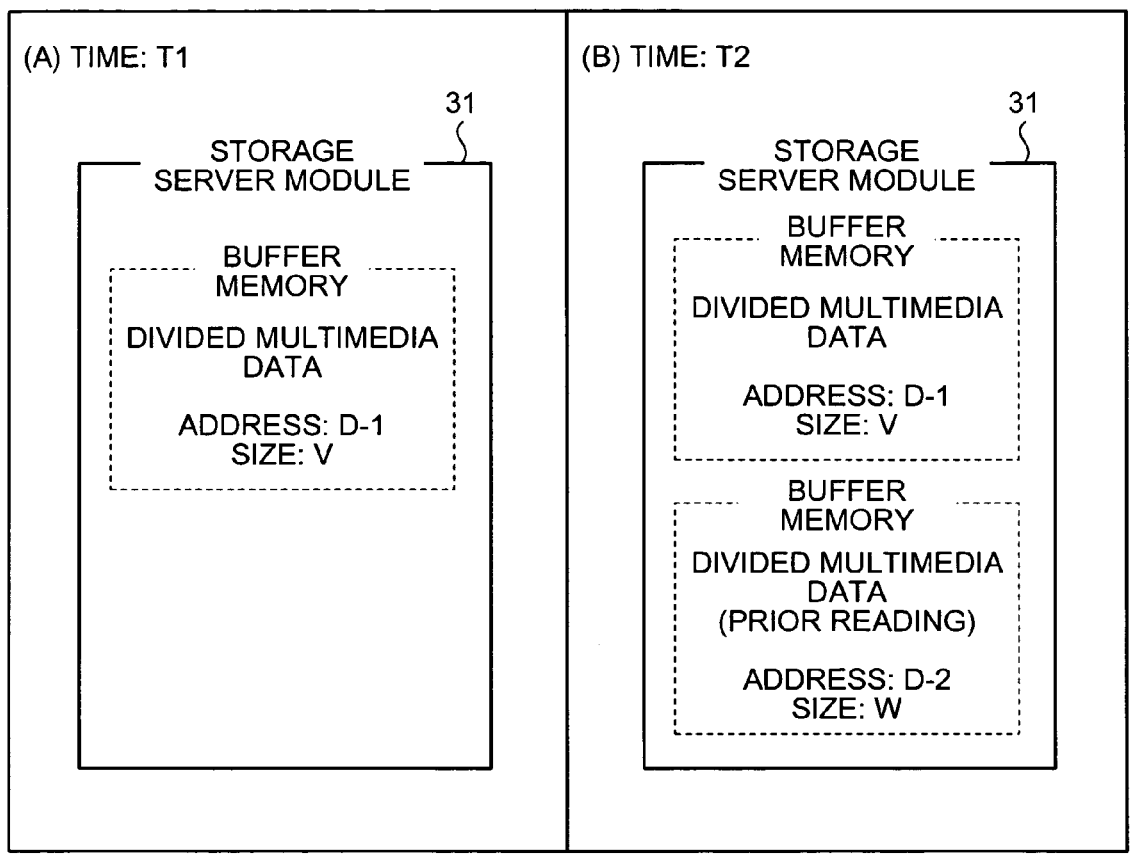
FIG. 22 is an example of buffer memory secured by previous data read.

According to the first embodiment of the present invention, as shown in FIG. 22, the storage server module 31 previously reads multimedia data requested by the buffer server module 21 from the storage device 41, and stores the multimedia data into a plurality of buffer memory areas. The storage server module 31 dynamically notifies the buffer server module 21 of memory information (for example, address: D-2, and size: W) on the memory area that stores divided multimedia data to be read next to the first divided multimedia data. In other words, while absorbing the speed difference that occurs in each server module, and the storage server module 31 dynamically notifies the buffer server module 21 of the data storage location.

Thus, according to the present invention, unlike the general cluster parallel computer that fixedly uses a memory area, a stream transfer function can be realized through dynamic use of memory areas in the distributed multimedia server system that uses a cluster connection network.

Figure 8:
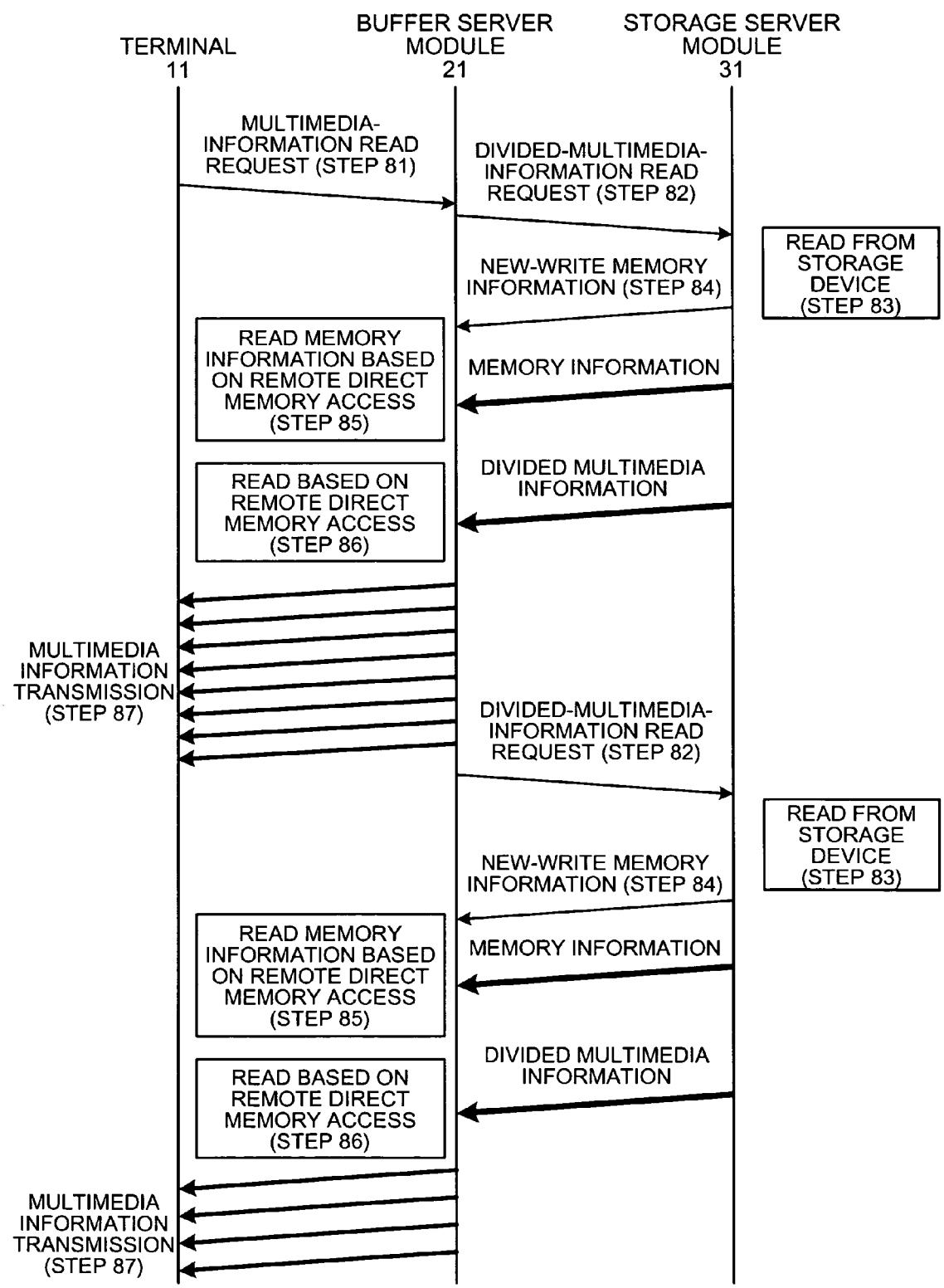
FIG. 8 is a schematic sequence diagram for explaining a second embodiment of the reproduction process.
Figure 9:
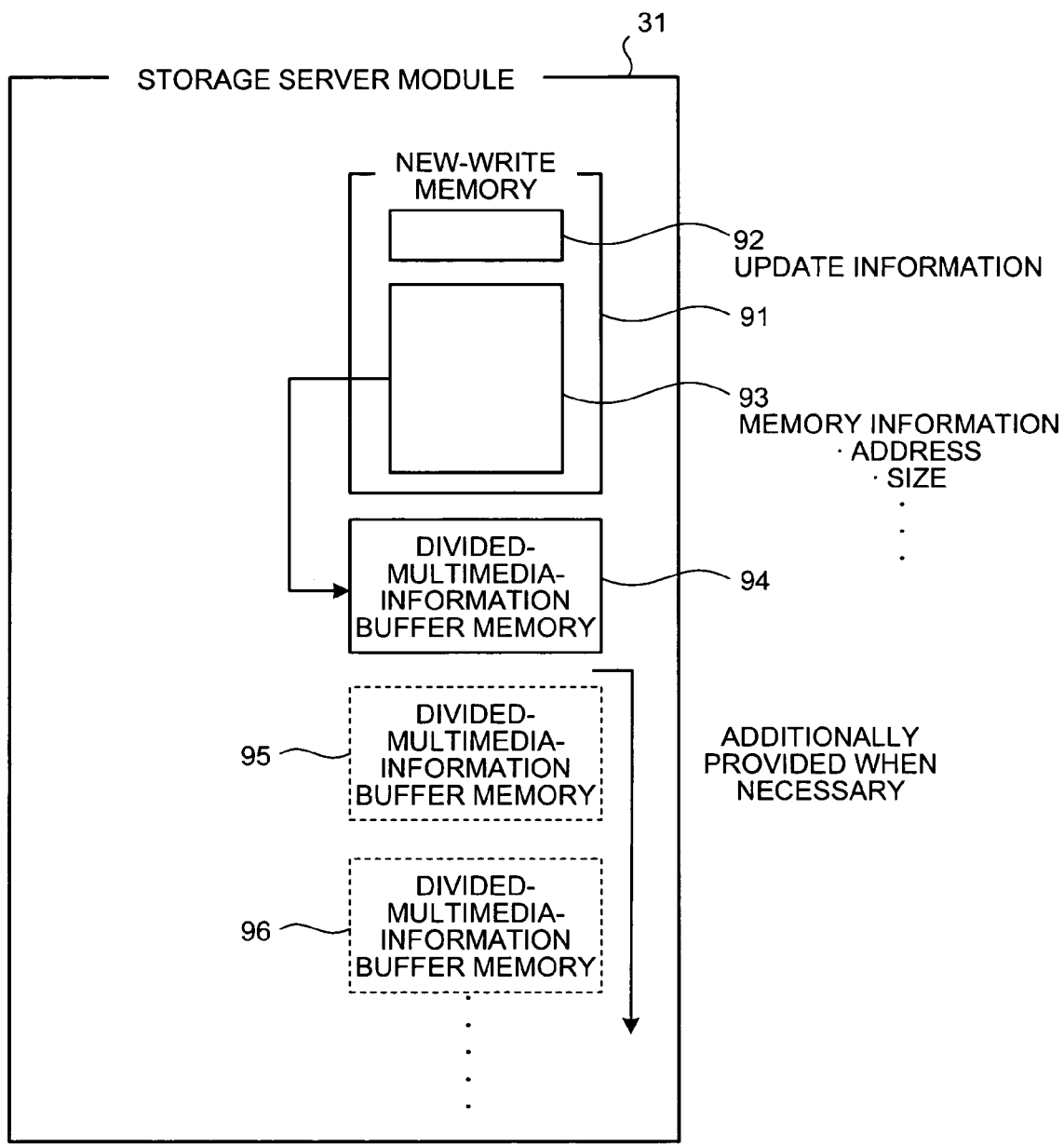
FIG. 9 is a schematic of a buffer memory configuration of a storage server module in the second embodiment of the reproduction process.

FIG. 8 is a sequence diagram of a second embodiment of a transmission process. FIG. 9 depicts a buffer memory configuration of the storage server module 31 in the second embodiment. In FIG. 9, reference numeral 91 represents a new-write memory. The new-write memory 91 stores update information 92 and memory information 93. Reference numeral 94 represents a divided-multimedia-information buffer memory. Divided-multimedia-information buffer memories 95, 96, . . . are additionally provided when necessary. The update information 92 indicates whether information is newly written. The memory information 93 is information on the divided-multimedia-information buffer memory (address, size, etc.).

A user transmits a multimedia-information read request from the terminal 11 to the buffer server module 21 to request multimedia information that the user wishes to obtain (step 81). In response to the request, the buffer server module 21 transmits a divided-multimedia-information read request to the storage server module 31 (step 82). The storage server module 31 is connected to the storage device 41 that stores the requested multimedia information in a divided manner. Having received the request, the storage server module 31 reads corresponding divided multimedia information from the storage device 41 into the divided-multimedia-information buffer memory 94 of the storage server module 31 (step 83), stores information (the memory information 93) on this buffer memory such as the address of the buffer memory 94 and size of data therein in the new-write memory 91, and returns a response (step 84). This response includes information (new-write memory information) on the new-write memory 91 such as the address of the memory. Based on this response, the buffer server module 21 fetches the memory information 93 from the storage server module 31 through remote direct memory access (step 85). The buffer server module 21 fetches the divided multimedia information from the divided-multimedia-information buffer memory of the storage server module 31 through remote direct memory access based on the memory information 93 (step 86). The buffer server module 21 transmits the divided multimedia information to a terminal specified by the multimedia-information read request via the distribution network 61 (step 87). To continuously transmit the divided multimedia information, the steps 82 to 87 are repeated in a similar manner as in the first embodiment. If the new-write memory information included in the response at step 84 is stored in the buffer server module 21, there is no need to transmit the second and subsequent transmissions of the divided-multimedia-information read request (step 82) and the return of the response (step 84). Instead, a buffer-release request to release the buffer memory that has stored the divided multimedia information is transmitted to the buffer server module 21. Consequently, even with this transmission, the number of steps of the communication process can be reduced. If, at step 84, information (the update information 92) that indicates whether divided multimedia information is newly written into the buffer memory (the divided-multimedia-information buffer memory) 94 indicated by the memory information 93 in the new-write memory 91 is stored together with the memory information 93 in the new-write memory 91 as shown in FIG. 9, the buffer server module 21 can be informed at step 85 whether the storage server module 31 has additionally written divided multimedia information. The update information 92 can be obtained with a counter that increments the count by one or a counter that alternately repeats 0 and 1. When the buffer server module 21 determines at step 85 that the data in the divided-multimedia-information buffer memory has not been updated based on the update information 92, the buffer server module 21 repeats step 85 during a predetermined retry time until the update information 92 is updated, thereby continuing the subsequent process.

Figure 10:
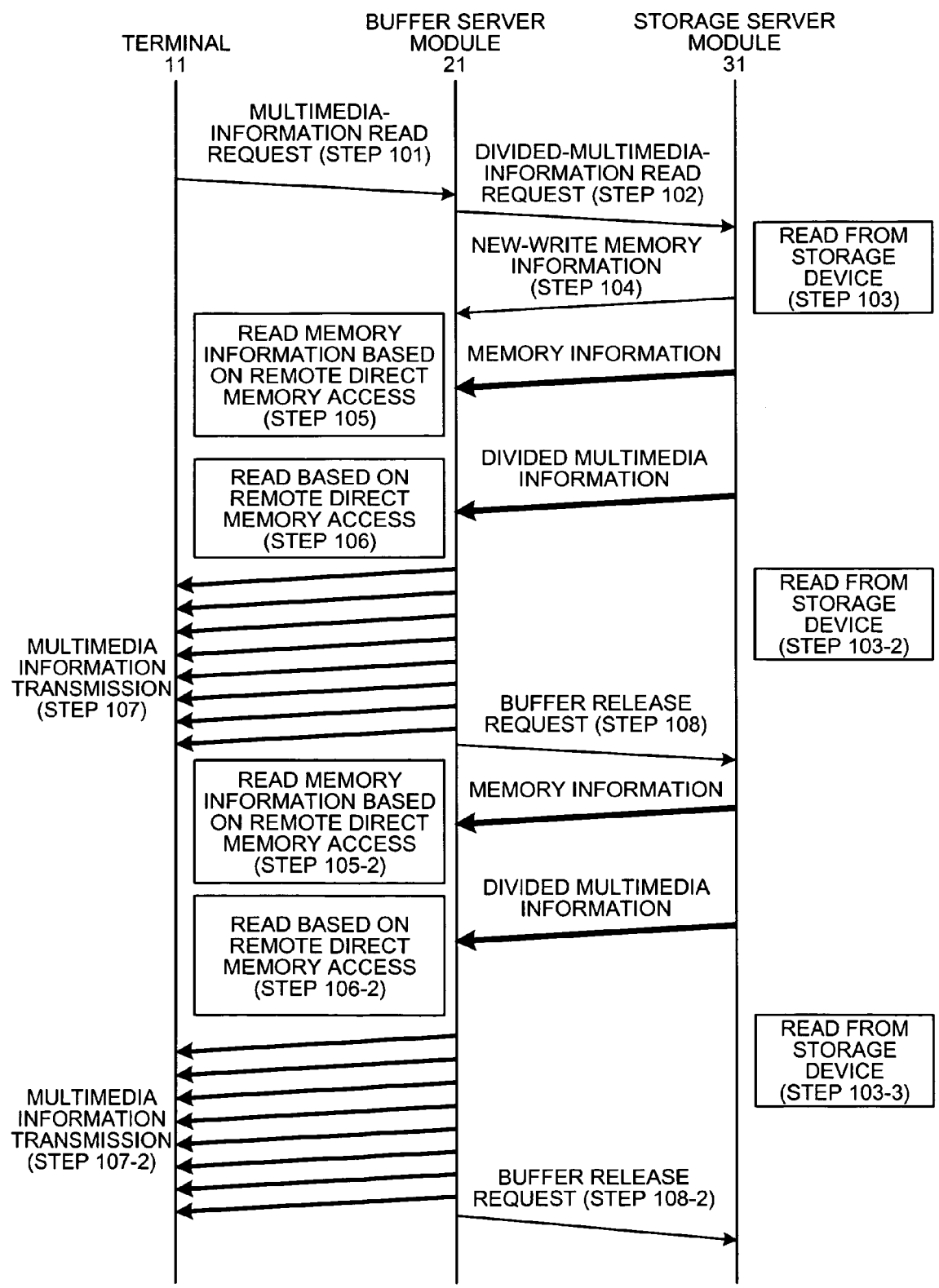
FIG. 10 is a schematic sequence diagram of the second embodiment of the reproduction process using a plurality of buffers.

As in the first embodiment, with a plurality of buffer memories in the storage server module 31 (the divided-multimedia-information buffer memories 95, 96, . . . additionally provided in the storage server module 31 as shown in FIG. 9), reading from the storage (step 103-2) and transmission to the terminal (step 107) can be performed in parallel as shown in FIG. 10. Accordingly, the process can be performed in a pipeline manner between the storage server module 31 and the buffer server module 21, and high performance can be achieved.

In the first embodiment (FIG. 6 and FIG. 7) and the second embodiment (FIG. 8 and FIG. 10), consider that if the buffer server module 21 is notified of the memory information at step 64 in FIG. 6 and at step 74 in FIG. 7 as well as the new-write information at step 84 in FIG. 8 and at step 104 in FIG. 10 by other modules including the storage server module 31 before the arrival of a divided-multimedia-information read request therefrom (for example, at activation of the system), or the information is stored in the buffer server module 21 beforehand. In the first embodiment, this eliminates the need to transmit the memory information at step 64 in FIG. 6, and the amount of data transmitted between the buffer server module 21 and the storage server module 31 can be reduced.

Figure 11:
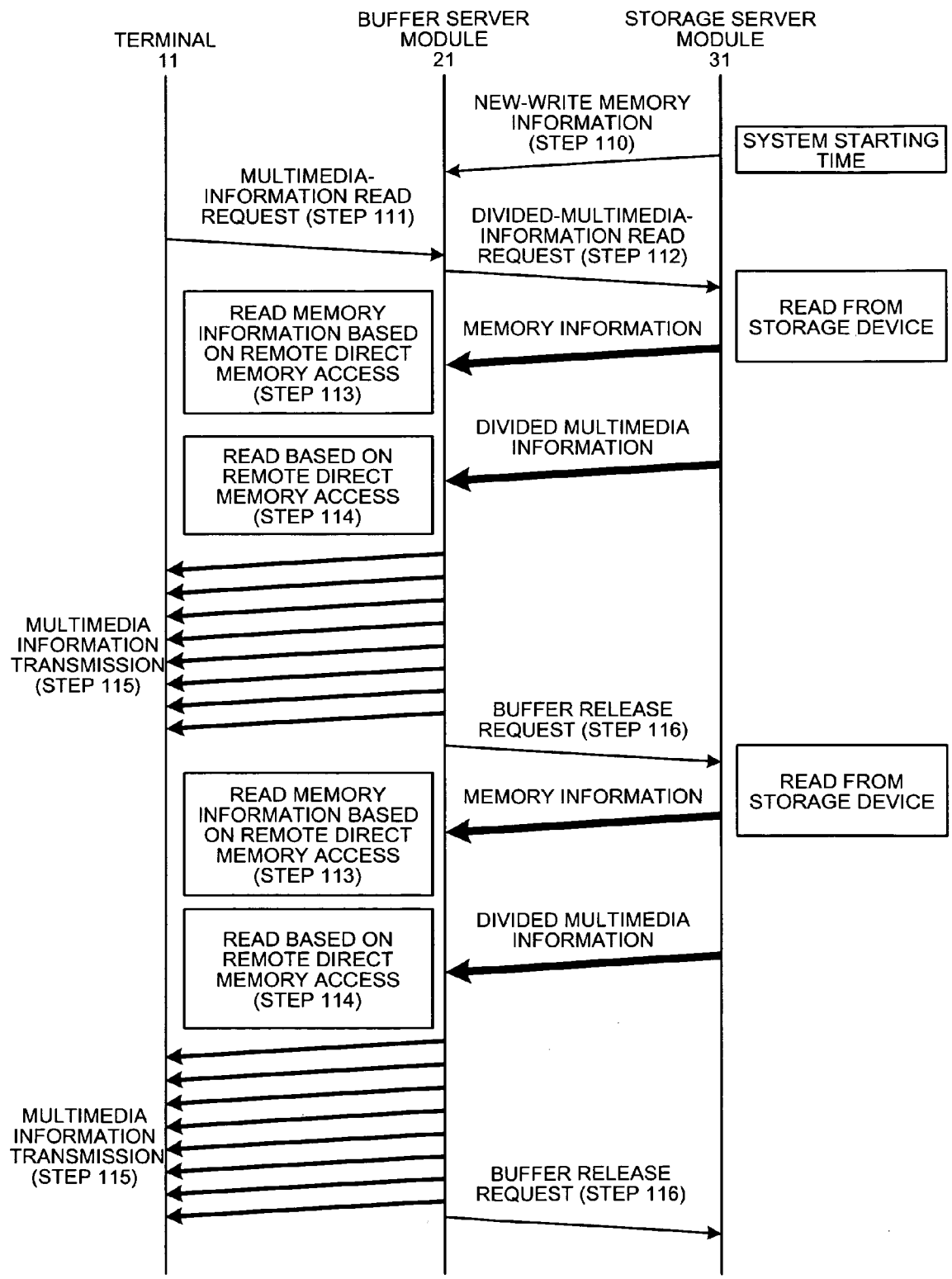
FIG. 11 is a schematic sequence diagram of the second embodiment of the reproduction process in which new-write memory information is obtained at activation.

In the second embodiment, in addition that the new-write information is not transmitted at step 84 in FIG. 8, if, as shown in FIG. 11, after transmitting a first divided-multimedia-information read request (step 112), the buffer server module 21 fetches the memory information 93 from the storage server module 31 (step 113) through remote direct memory access based on the new-write memory information obtained in advance (for example, at activation of the system as shown at step 110 in FIG. 11). Then, the buffer server module 21 fetches divided multimedia information from the storage server module 31 through remote direct memory access based on the memory information 93 (step 114). The divided multimedia information is transmitted to a terminal specified by the divided-multimedia-information read request via the network (step 115). At the step of transmitting a buffer release request to the storage server module (step 116) and thereafter, the process at steps 113 to 116 is repeated, which further reduces the number of times of transmission.

Figure 12:
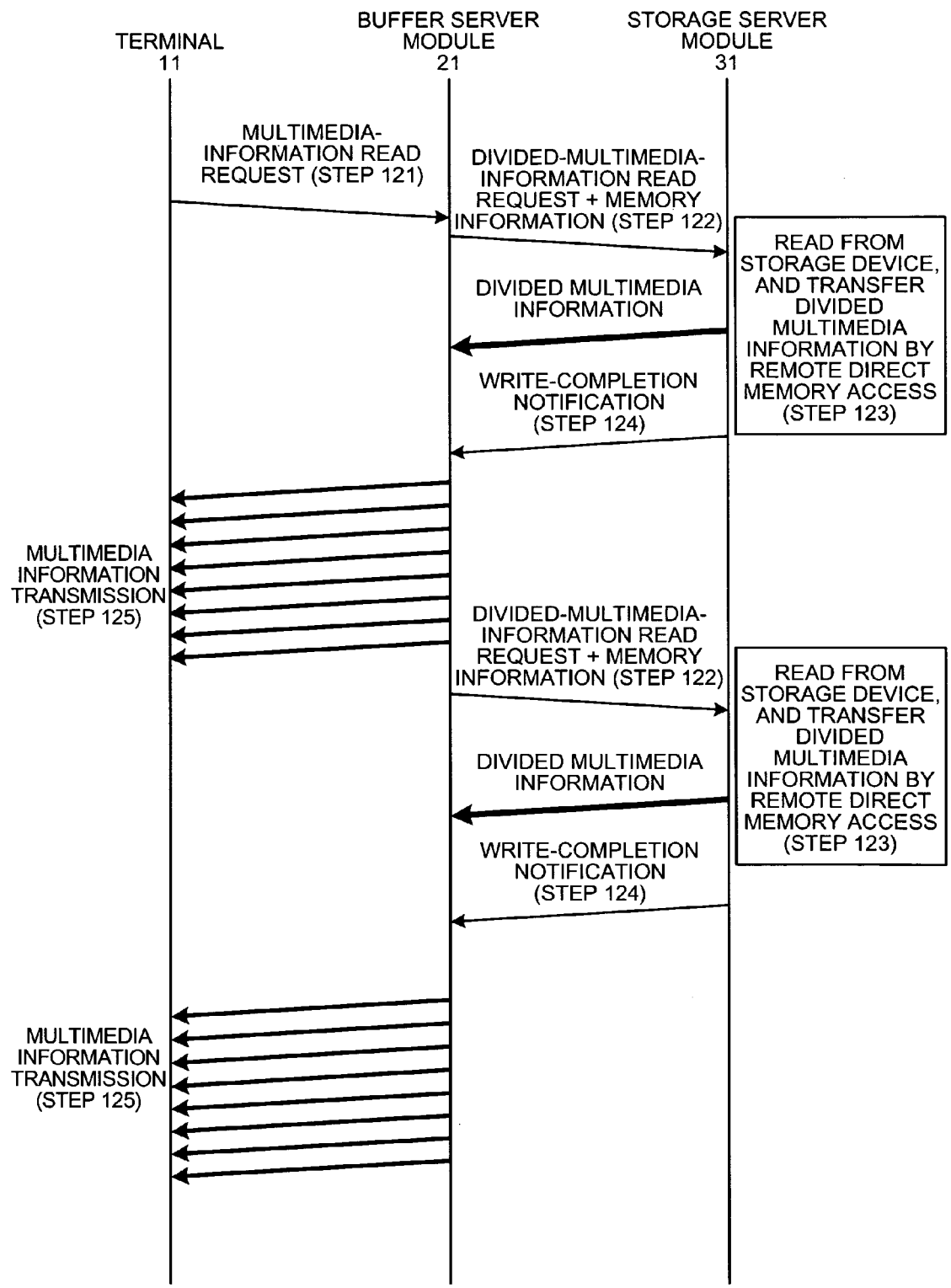
FIG. 12 is a schematic sequence diagram for explaining a third embodiment of the reproduction process.

Shown in FIG. 12 is a third embodiment of a processing sequence. First, a user transmits a multimedia-information read request from the terminal 11 to the buffer server module 21 to request multimedia information that the user wishes to obtain (step 121). In response to the request, the buffer server module 21 transmits a divided-multimedia-information read request to the storage server module 31 (step 122). The storage server module 31 is connected to the storage device 41 that stores the requested multimedia information in a divided manner. This request includes information (memory information) on a buffer memory of the buffer server module 21. Having received the request, the storage server module 31 reads corresponding divided multimedia information from the storage device 41 into the buffer memory specified by the divided-multimedia-information read request through remote direct memory access (step 123), and returns a response indicating that the information is written (step 124). The buffer server module transmits the divided multimedia information in the own buffer memory to a terminal specified by the multimedia-information read request from the terminal 11 via the network (step 125). The above process from steps 122 to 125 is repeated to transmit the following divided multimedia information.

The third embodiment differs from the first and second embodiments in that the module that performs remote direct memory access is different. The load and performance of remote direct memory access vary as to remote direct memory access write according to products with remote direct-memory-access capabilities. Therefore, it is better to be able to select suitable operation.

Figure 13:
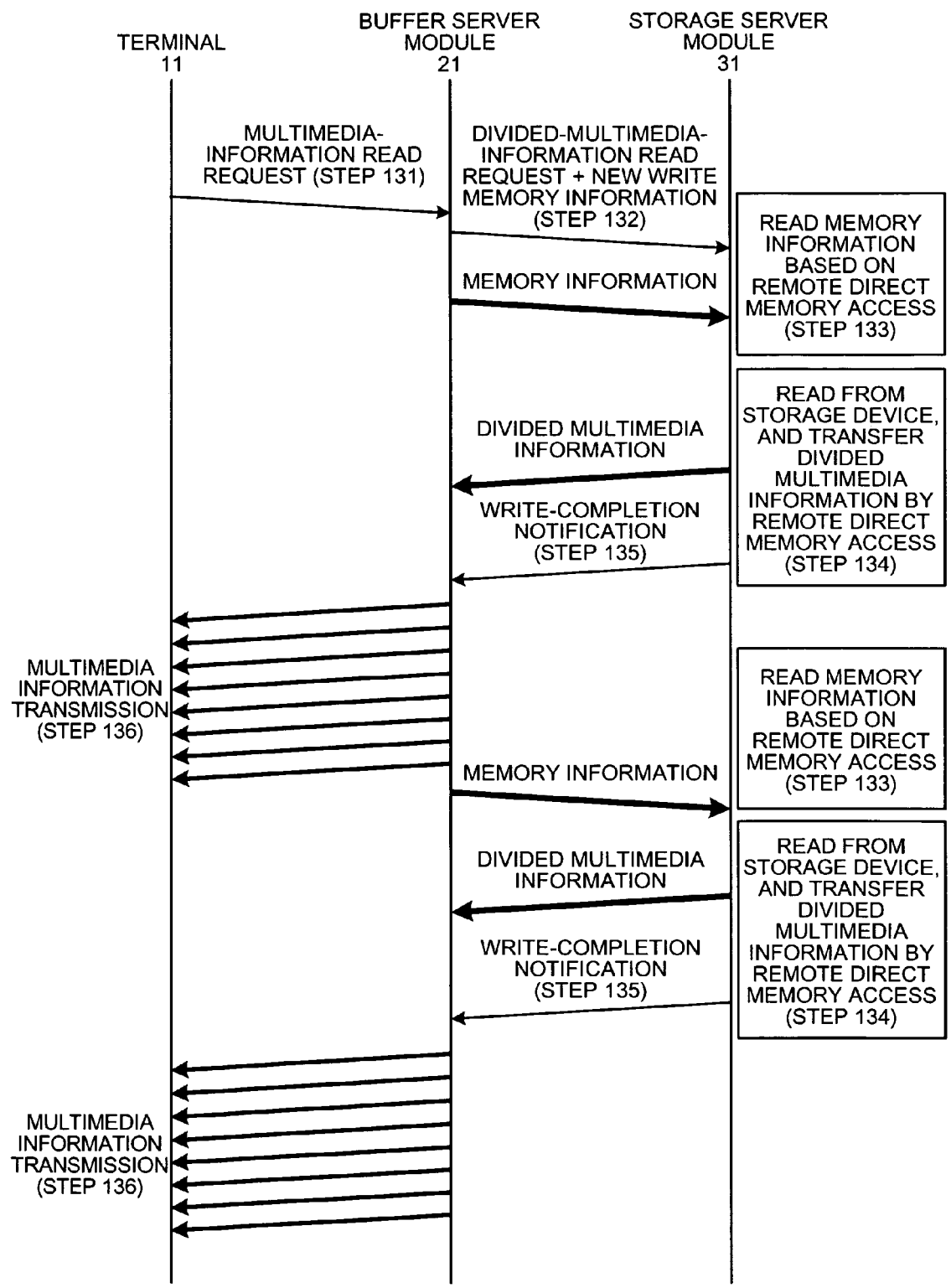
FIG. 13 is a schematic sequence diagram for explaining a fourth embodiment of the reproduction process.

According to a fourth embodiment, the number of times of communication in the third embodiment can be reduced. Shown in FIG. 13 is the fourth embodiment of a processing sequence. First, a user transmits a multimedia-information read request from the terminal 11 to the buffer server module 21 to request multimedia information that the user wishes to obtain (step 131). In response to the request, the buffer server module 21 transmits a divided-multimedia-information read request to the storage server module 31 (step 132). The storage server module 31 is connected to the storage device 41 that stores the requested multimedia information in a divided manner. This request includes information on the buffer memory of the buffer server module 21 and information on the buffer memory that stores information (new-write information) indicating whether there is any available buffer memory. Next, having received the request, the storage server module 31 fetches new-write memory information from the buffer memory specified by the divided-multimedia-information read request through remote direct memory access (step 133), and confirms that the buffer memory indicated by this information is available. Then, the storage server module 31 reads corresponding divided multimedia information from the storage device 41, transfers the divided multimedia information to the buffer memory of the buffer server module 21 through remote direct memory access (step 134), and returns a response indicating that the information is written (step 135). Instead of returning the response, the information indicating that the information is written by remote direct memory access can be written into the buffer memory that stores the new-write memory information. The buffer server module receives the response, and transmits the divided multimedia information in the own buffer memory to a terminal specified by the multimedia-information read request from the terminal 11 via the network (step 136). The above process from steps 133 to 136 is repeated to transmit the following divided multimedia information. To reduce the number of times of communication, the storage server module 31 stores the new-write memory information contained in the divided-multimedia-information read request in the own module to eliminate the need to transmit the second and subsequent divided-multimedia-information read requests.

Figure 14:
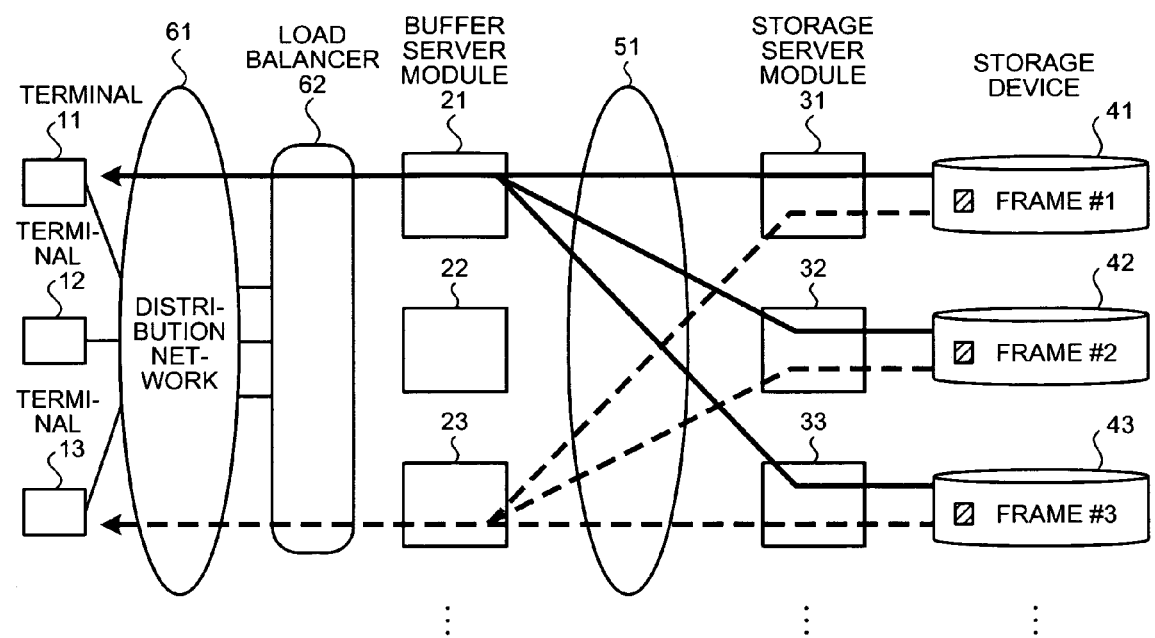
FIG. 14 is an explanatory diagram of a multimedia information storage and transmission system in a distributed multimedia server system capable of transmission to a plurality of terminals.
Figure 15:
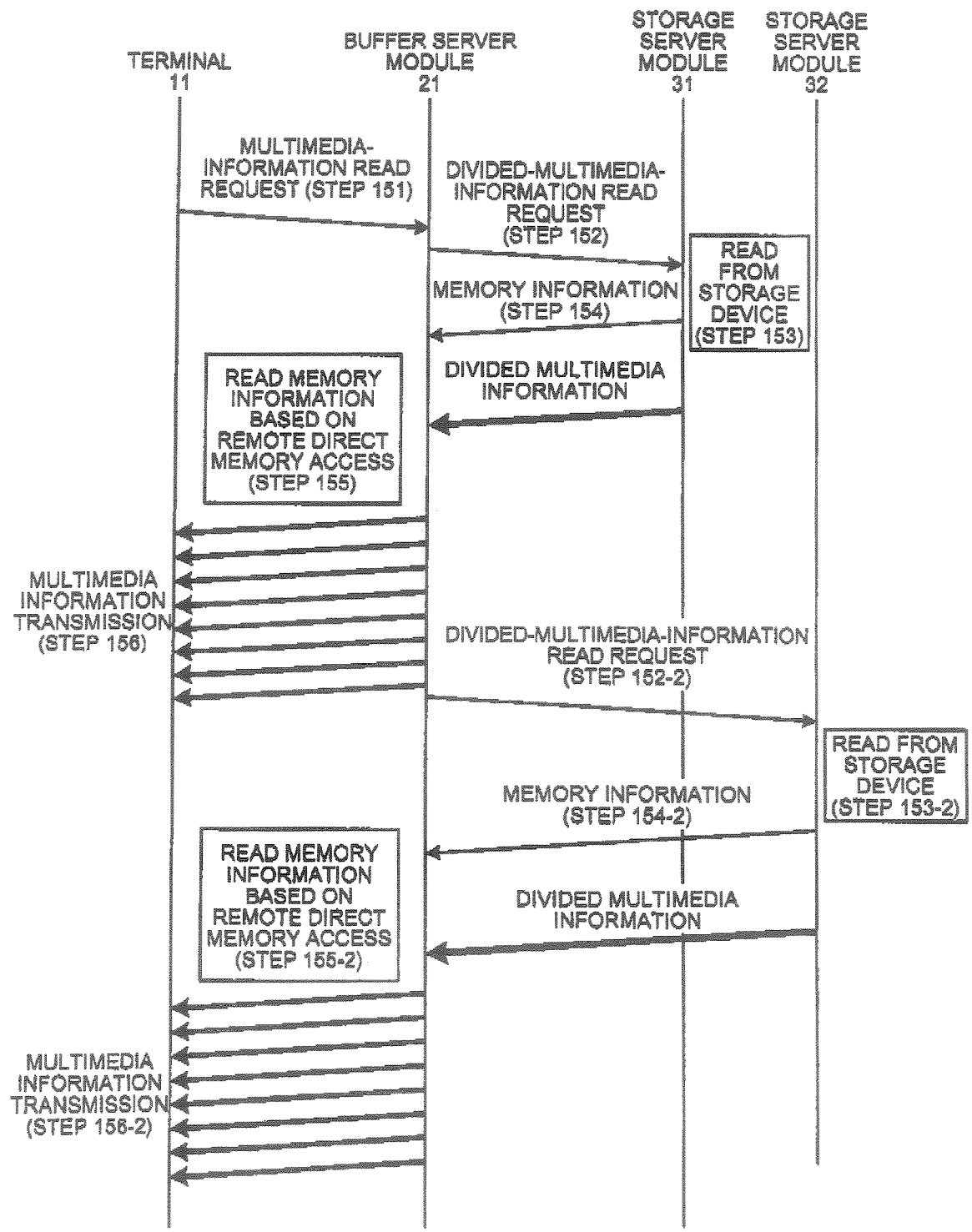
FIG. 15 is a schematic sequence diagram of the first embodiment of the reproduction process enhanced for a multiple storage server module configuration.

In a system that distributes information to a number of terminals, multimedia information is divided and stored in a plurality of the storage server modules 31, 32, 33, . . . as shown in FIG. 14 (in the example shown in FIG. 14, visual data is stored in a frame unit), and access is made to the storage server modules 31, 32, 33, . . . . In FIG. 14, a frame #1 is stored in the storage device 41, a frame #2 is stored in the storage device 42, and a frame #3 is stored in the storage device 43. FIG. 15 is a sequence diagram of the first embodiment of the process enhanced for a multiple storage server configuration. First, a user transmits a multimedia-information read request from the terminal 11 to the buffer server module 21 to request multimedia information that the user wishes to obtain (step 151). In response to the request, the buffer server module 21 transmits a divided-multimedia-information read request to the storage server module 31 (step 152). The storage server module 31 is connected to the storage device 41 that stores a header (the frame #1) of the requested multimedia information. Having received the request, the storage server module 31 reads corresponding divided multimedia information from the storage device 41 into the buffer memory of the storage server module 31 (step 153), and returns as a response information (memory information) on this buffer memory such as the address of the buffer memory and size of data therein (step 154). Based on this information, the buffer server module 21 fetches the divided multimedia information from the storage server module 31 through remote direct memory access (step 155), and transmits the divided multimedia information to a terminal specified by the multimedia-information read request via the network (step 156). Needless to mention, the transmission destination can be the terminal that has first transmitted the request. The buffer server module 21 transmits a divided-multimedia-information read request to the storage server module 32 that is connected to the storage device 42 that stores the next divided multimedia information (the frame #2) (step 152-2). The storage server module 32 is connected to the storage device 42 that stores the next divided multimedia information (the frame-#2). Thereafter, the process the same as that from steps 153 to 156 is repeated, and the buffer server module 21 transmits the divided-multimedia-information read request to the next storage server module 33. The above process is sequentially performed with respect to all storage server modules connected to a storage device that stores the requested multimedia information. Then, a divided-multimedia-information read request is transmitted again to the storage server module to which the first divided-multimedia-information read request has been transmitted. The process at step 152 and thereafter is repeated again to deliver the multimedia information to the terminal 11 as indicated by solid lines in FIG. 14. Similarly, when there is a read request from the terminal 13 to the buffer server module 23, multimedia information is delivered as indicated by dotted lines in FIG. 14. The same can be applied to the second, the third, and the fourth embodiments. With this, load on the storage server module can be reduced to 1/N, where N is the number of storage server modules. Therefore, even when receiving requests from a large number of terminals, the storage server module can handle the requests without any problem. When a plurality of buffer server modules are provided, a load dispersing device such as a load balancer 62 is placed between the buffer server modules 21, 22, 23, . . . and the terminals as shown in FIG. 14. Thus, load can be distributed, and high throughput can be achieved in the entire distributed server system.

Figure 16:
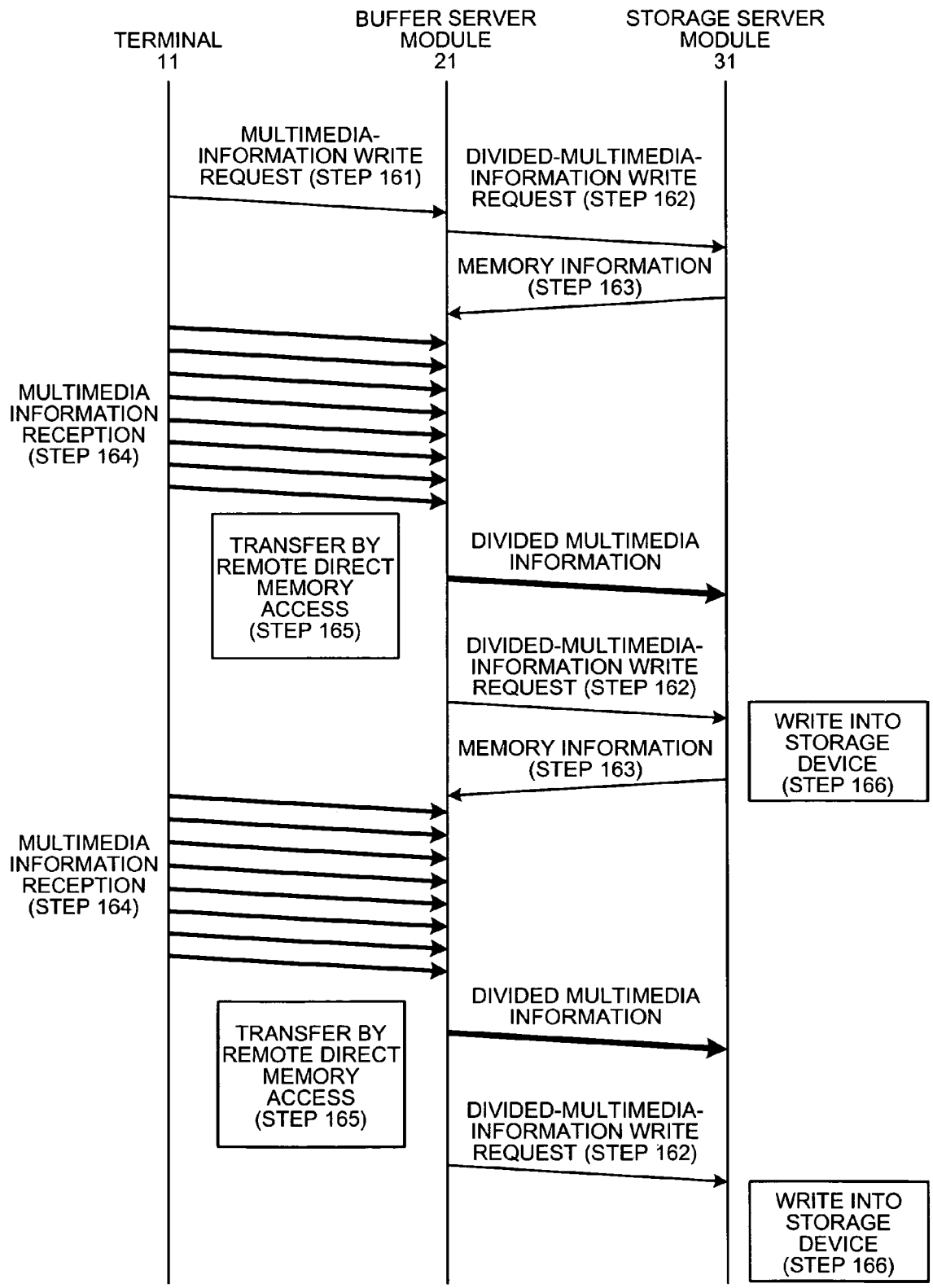
FIG. 16 is a schematic sequence diagram for explaining a first embodiment of a registration process.
Figure 17:
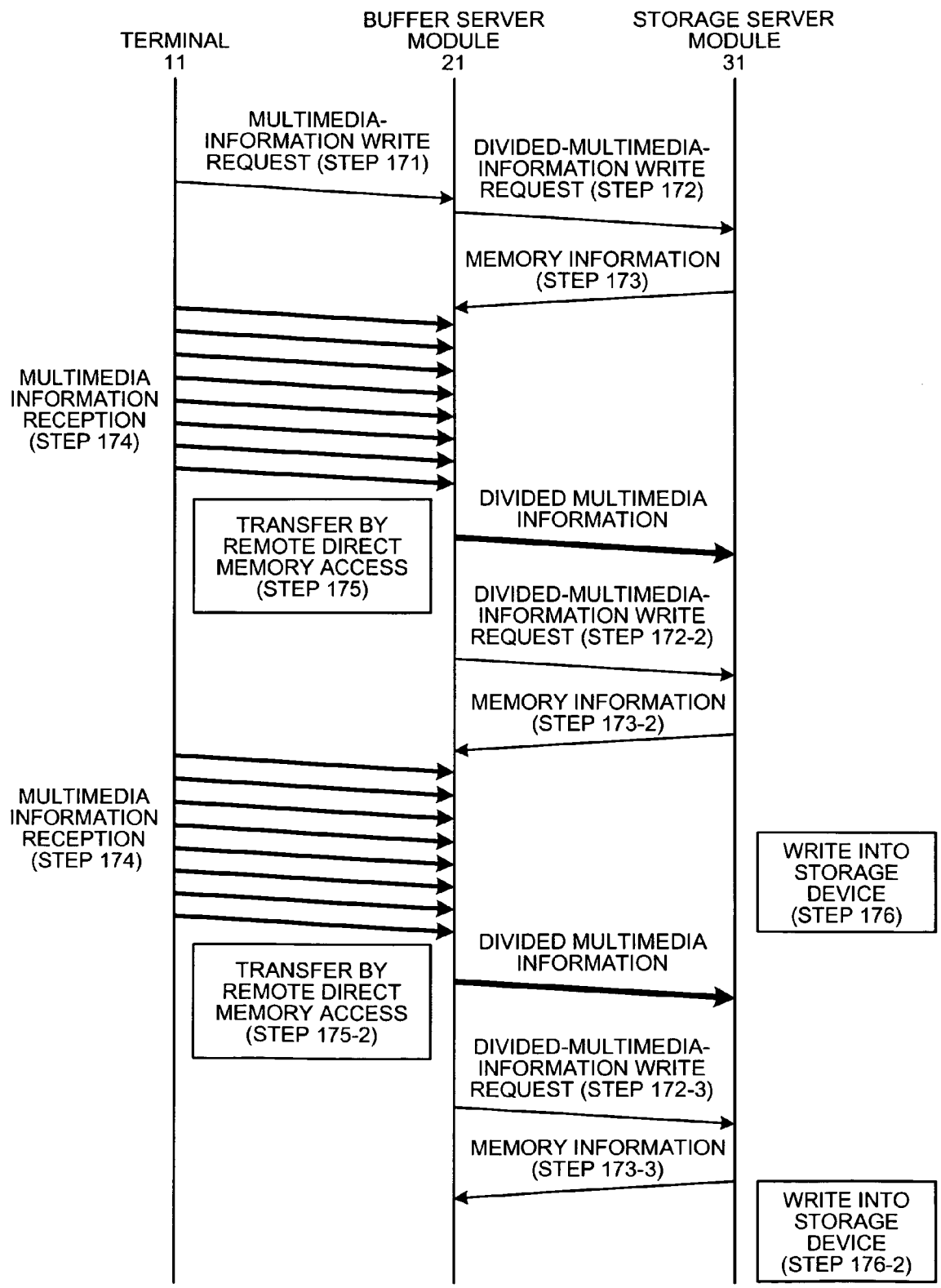
FIG. 17 is a schematic sequence diagram of the first embodiment of the registration process using a plurality of buffers.

Next, the first embodiment of multimedia information registration is explained in which the terminal registers multimedia information in the dispersed multimedia server system, i.e., multimedia information is transmitted from the terminal to the dispersed multimedia server system. FIG. 16 depicts this processing sequence. A user transmits a multimedia-information write request from the terminal 11 to the buffer server module 21 (step 161). In response to the request, the buffer server module 21 transmits a divided-multimedia-information write request to the storage server module 31 (step 162). Having received the request, the storage server module 31 returns as a response information (memory information) on the own buffer memory to receive divided multimedia information from the buffer server module 21 (step 163). Upon receiving this response, the buffer server module 21 receives multimedia information, and divides the multimedia information (step 164). The buffer server module 21 transfers the divided multimedia information to the buffer memory of the storage server module 31 based on the memory information contained in the response to the divided-multimedia-information write request through remote direct memory access (step 165). The storage server module 31 stores the transferred divided multimedia information in the storage device 41 upon receiving the next divided-multimedia-information write request (step 166). All the multimedia information can be stored by repeatedly performing the above process from steps 162 to 166. With a plurality of buffer memories that store divided multimedia information in the storage server module 31, the process from steps 174-2 to 175-2 and step 176 can be performed in parallel in a pipeline manner as shown in FIG. 17. Thus, high-speed operation can be achieved.

Figure 18:
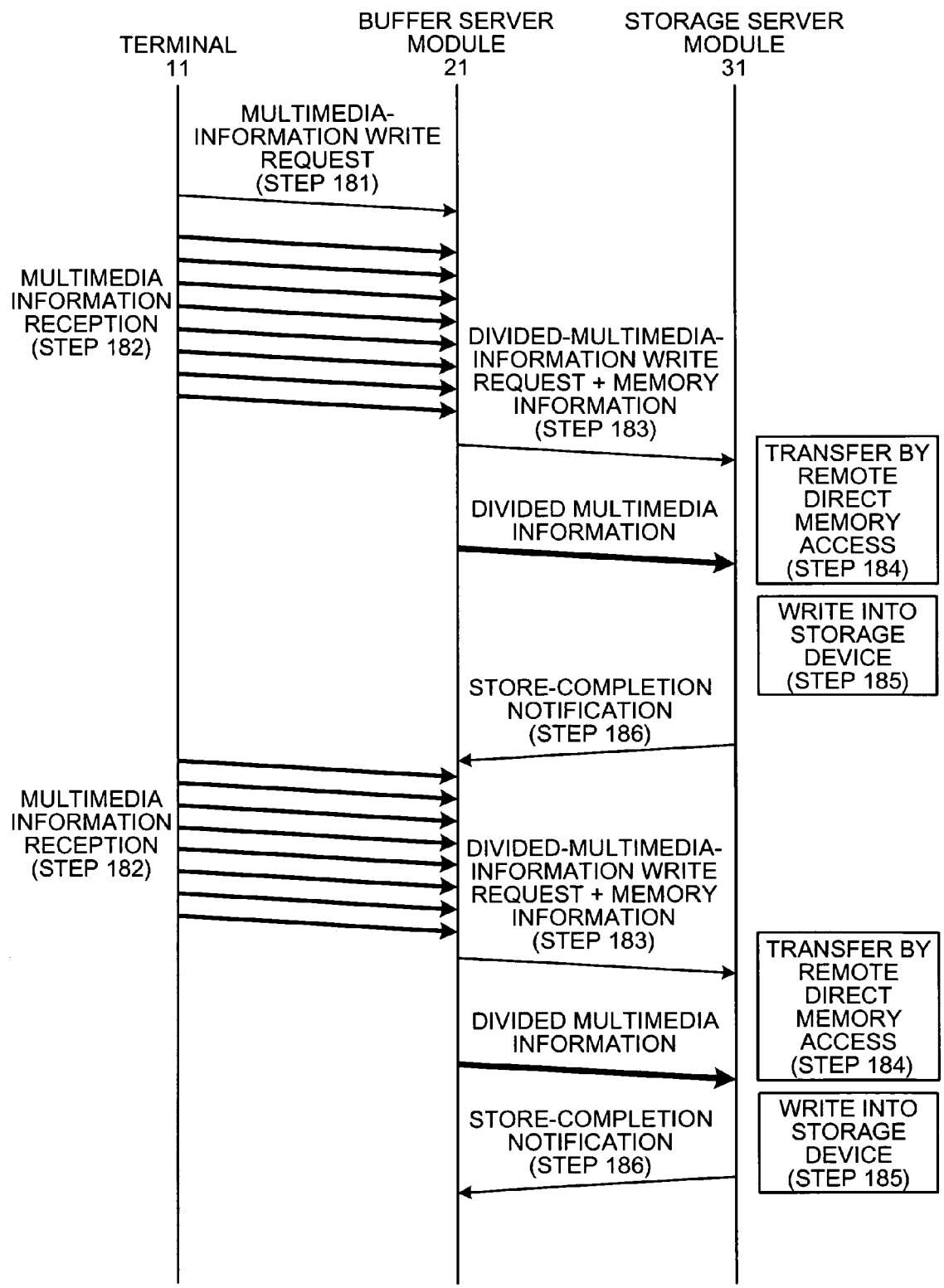
FIG. 18 is a schematic sequence diagram for explaining the first embodiment of the registration process.

The second embodiment of multimedia information registration from the terminal is explained. FIG. 18 depicts this processing sequence. A user transmits a multimedia-information write request from the terminal 11 to the buffer server module 21 (step 181). In response to the request, the buffer server module 21 receives multimedia information from the terminal 11, and divides this information (step 182). The buffer server module 21 transmits a divided-multimedia-information write request, including information (memory information) on the buffer memory that temporarily stores divided multimedia information, to the storage server module 31 (step 183). Having received the request, the storage server module 31 fetches the divided multimedia information through remote direct memory access based on the memory information (step 184), stores the divided multimedia information in the storage device 41 (step 185), and notifies the buffer server module 21 of the completion of the storing (step 186). The process from steps 182 to 186 is repeated so that all the multimedia information can be stored in the storage device. With a plurality of buffer memories in the buffer server module, step 182 and the process from steps 184 to 185 can be performed in parallel in a pipeline manner. Thus, high-speed operation can be achieved.

Figure 19:
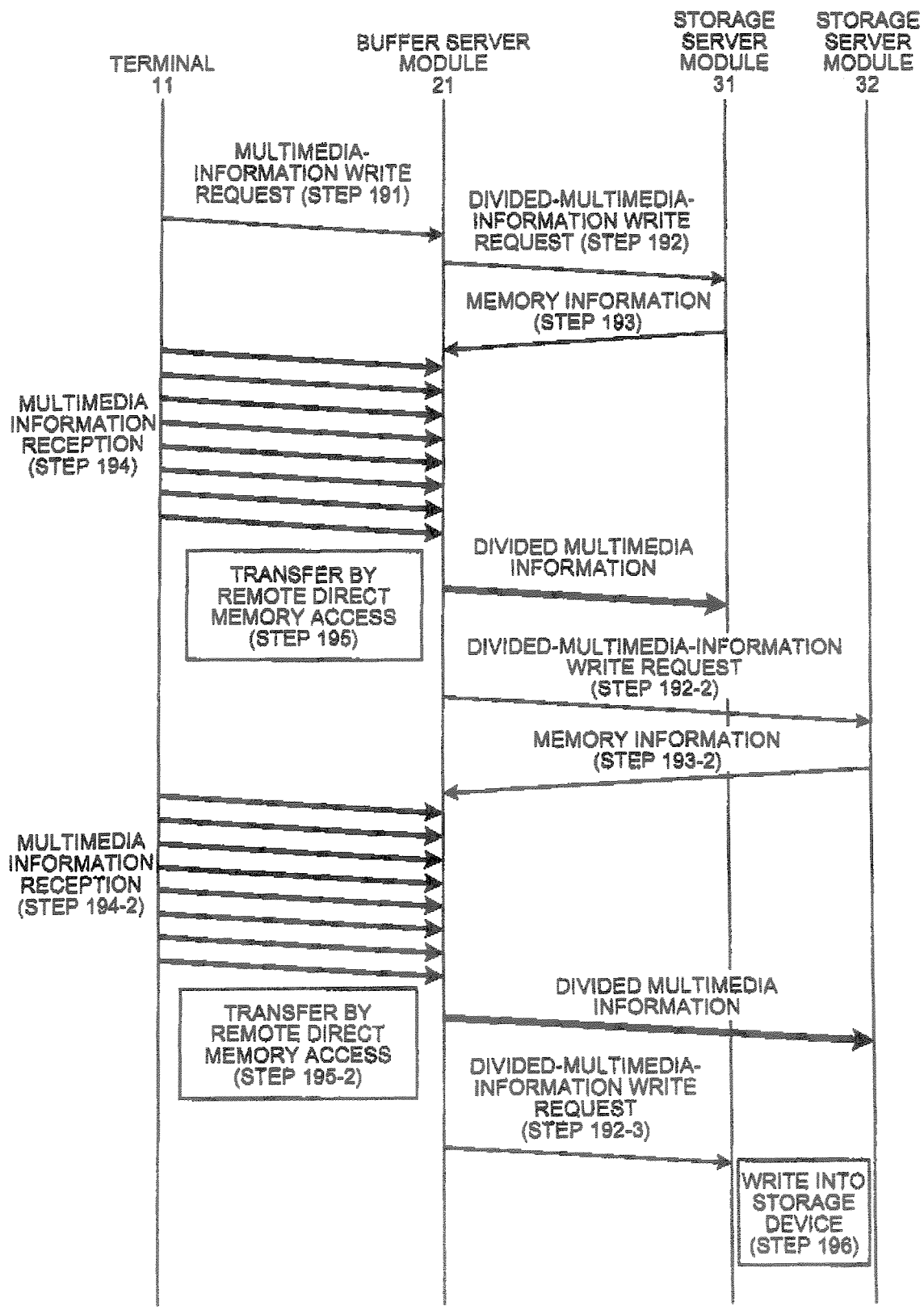
FIG. 19 is a schematic sequence diagram of the first embodiment of the registration process enhanced for a multiple storage server module configuration.

As with reproduction process, when a number of terminals register information, multimedia information is divided and stored in a plurality of storage server modules as shown in FIG. 14, and access is made to the storage server modules. FIG. 19 is a sequence diagram of the first embodiment of the registration process enhanced for a two-storage server module configuration. A user transmits a multimedia-information write request from the terminal 11 to the buffer server module 21 (step 191). In response to the request, the buffer server module 21 transmits a divided-multimedia-information write request to the storage server module 31 (step 192). Having received the request, the storage server module 31 returns as a response information (memory information) on the own buffer memory to receive divided multimedia information from the buffer server module 21 (step 193). Upon receiving this response, the buffer server module 21 receives multimedia information, and divides the multimedia information (step 194). The buffer server module 21 transfers the divided multimedia information to the buffer memory of the storage server module 31 based on the memory information contained in the response to the divided-multimedia-information write request through remote direct memory access (step 195), The storage server module 31 stores transferred divided multimedia information in the storage device 41 (step 196) upon receiving the next divided-multimedia-information write request (step 192-3). The buffer server module 21 transmits a divided-multimedia-information write request to the storage server module 32 (step 192-2), and the process from steps 193-196 is repeated. When the number of storage server modules is increased, the divided multimedia information is stored sequentially in the storage server modules 33, 34, 35, . . . , following the above process. After completion of the process in the last storage server module, the storing of the divided multimedia information is performed again from the first storage server module 31, Thus, even when requests are received from a large number of terminals, the requests can be processed.

While different embodiments of the reproduction process and the registration process have been explained above, a distributed multimedia server system can be implemented using any combination of corresponding embodiments (for example, a combination of the first embodiment of the reproduction process and the first embodiment of the registration process), or non-corresponding embodiments (for example, a combination of the first embodiment of reproduction process and the second embodiment of registration process).

Each server module described above in each embodiment includes units that achieve the respective functions, operations and steps, which can be implemented by a computer program executed on a computer. Such a computer program can be stored in a storage medium. Instead, part or all of the units can be implemented by hardware.

While the present invention has been described with reference to illustrative embodiments for particular applications, the present invention is not limited to these embodiments, and can be variously modified without departing from the scope of the invention.

The invention claimed is:

1. A distributed multimedia server system, in which multimedia information is divided to be stored, and distributed in response to a request from a terminal, the distributed multimedia server system comprising:

a first server module;

a second server module that is connected to a storage device that stores therein multimedia information in a divided manner, and includes a first and second buffer memory to store divided multimedia information read from the storage device, the first server module and the second server module being connected by a local area network; and an intercluster connection network, which connects the first server module and the second server module, that allows the first server module and the second server module to mutually access each other's memories by remote direct memory access, such that the first server module and the second server module are simultaneously connected by the local area network and the intercluster connection network, wherein the first server module includes a receiving unit that receives a first read request for multimedia information from a terminal; and a requesting unit that transmits, in response to the first read request, a second read request for first divided multimedia information corresponding to the multimedia information to the second server module using a networking protocol over the local area network;

the second server module includes
a first reading unit that dynamically secures an area of the first buffer memory according to size of the first divided multimedia information requested by the second read request, reads the first divided multimedia information from the storage device, and stores the first divided multimedia information in the first buffer memory;
a first transmitting unit that transmits first memory information on the first buffer memory that stores the first divided multimedia information to the first server module using the networking protocol over the local area network, the first memory information including an address of a location on the first buffer memory in which the first divided multimedia information is stored and the size of the first divided multimedia information therein, the address of the location allowing access to the location to obtain the first divided multimedia information therefrom by remote direct memory access via the intercluster connection network; and
the first server module further includes
a first transferring unit that obtains via the intercluster connection network the first divided multimedia information from the first buffer memory using remote direct memory access, based on the address of the location and the size of the first divided multimedia information included in the first memory information received from the second server module, and transmits, using streaming transmission, the first divided multimedia information to any one of the terminal, another terminal, and an address specified by the first read request; and
the second server module further includes
a second reading unit that reads second divided multimedia information which is to be read next to the first divided multimedia data from the storage device, and stores the second divided multimedia information in the second buffer memory, while the first transferring unit is obtaining and transmitting the first divided multimedia information which is read by the first reading unit of the second server module.

2. The distributed multimedia server system according to claim 1, wherein the second server module further includes
an information memory that stores therein update information indicating whether divided multimedia information has been newly written to the buffer memory, and the first memory information; and
a notifying unit that notifies the first server module of third memory information on the information memory, and
the transferring unit obtains, upon receiving the third memory information from the notifying unit, the update information and the first memory information based on the third memory information using remote direct memory access, and obtains, when divided multimedia information has been newly written, the divided multimedia information.

3. The distributed multimedia server system according to claim 2, wherein
the notifying unit notifies the first server module of the third memory information in advance, and
the transferring unit obtains, after the second read request is transmitted to the second server module, the update information and the first memory information based on the third memory information.

4. The distributed multimedia server system according to claim 1, wherein the notifying unit notifies the first server module of any one of the first memory information and the third memory information in advance or as a response to the second read request.

5. The distributed multimedia server system according to claim 1, wherein
the second server module includes a plurality of second server modules that store divided multimedia information in a round-robin manner, and
the requesting unit sequentially transmits a second read request to the second server modules.

6. The distributed multimedia server system according to claim 1, wherein
the receiving unit receives a first write request to write multimedia information from a terminal,
the requesting unit transmits, in response to the first write request, a second write request to write divided multimedia information corresponding to the multimedia information to the second server module,
the transferring unit transfers, based on third memory information on the buffer memory available to store the divided multimedia information received from the second server module, the divided multimedia information to the buffer memory using remote direct memory access, and
the second server module further includes a writing unit that writes the storage device with the divided multimedia information written to the buffer memory by the transferring unit.

7. The distributed multimedia server system according to claim 6, wherein
the second server module includes a plurality of second server modules, and
the requesting unit sequentially transmits a second read request to the second server modules.

8. The distributed multimedia server system according to claim 1, wherein
the first server module further includes a buffer memory to store divided multimedia information,
the receiving unit receives a first write request to write multimedia information from a terminal,
the requesting unit transmits, in response to the first write request, a second write request to write divided multimedia information corresponding to the multimedia information to the second server module, the second write request including third memory information on the buffer memory that stores the divided multimedia information, and
the second server module further includes a transferring unit that reads the divided multimedia information from the buffer memory based on the third memory information to transfer the divided multimedia information to the storage device using remote direct memory access.

9. The distributed multimedia server system according to claim 8, wherein
the second server module includes a plurality of second server modules, and
the requesting unit sequentially transmits a second read request to the second server modules.

10. A distributed multimedia server system, in which multimedia information is divided to be stored, and distributed in response to a request from a terminal, the distributed multimedia server system comprising:
a first server module that includes a buffer memory to store divided multimedia information;
a second server module that is connected to a storage device that stores therein multimedia information in a divided manner, the first server module and the second server module being connected by a local area network; and an intercluster connection network, which connects the first server module and the second server module, that allows the first server module and the second server module to mutually access each other's memories by remote direct memory access, such that the first server module and the second server module are simultaneously connected by the local area network and the intercluster connection network, wherein the first server module includes a receiving unit that receives a first read request for multimedia information from a terminal; and a requesting unit that dynamically secures, in response to the first read request, an area of the buffer memory according to size of first divided multimedia information corresponding to the multimedia information requested by the first read request, and transmits a second read request for the first divided multimedia information to the second server module using a networking protocol over the local area network, the second read request including first memory information on the buffer memory, the first memory information including an address of a location on the buffer memory in which the first divided multimedia information is to be stored and the size of the first divided multimedia information therein, the address of the location allowing access to the location to transfer the first divided multimedia information thereto by remote direct memory access via the intercluster connection network;

the second server module includes a first transferring unit that reads the first divided multimedia information requested by the second read request from the storage device to transfer, via the intercluster connection network, the first divided multimedia information to the buffer memory based on the address of the location and the size of the first divided multimedia information included in the first memory information using remote direct memory access; and a notifying unit that notifies the first server module that the first divided multimedia information has been written to the buffer memory using the networking protocol over the local area network;

the first server module further includes a transmitting unit that transmits, using streaming transmission, the first divided multimedia information to any one of the terminal, another terminal, and an address specified by the first read request; and the second server module further includes a second transferring unit that reads second divided multimedia information which is to be read next to the first divided multimedia information from the storage device, while the transmitting unit is transmitting the first divided multimedia information which is read by the first transferring unit of the second server module.

11. The distributed multimedia server system according to claim 10, wherein the first server module further includes an information memory that stores therein information indicating whether the divided multimedia information has been written by the second server module, the second read request further includes an address of the information memory, and the notifying unit writes the information memory with information indicating that the divided multimedia information has been written.

12. The distributed multimedia server system according to claim 10, wherein the second server module includes a plurality of second server modules that store divided multimedia information in a round-robin manner, and the requesting unit sequentially transmits a second read request to the second server modules.

13. The distributed multimedia server system according to claim 10, wherein the receiving unit receives a first write request to write multimedia information from a terminal, the requesting unit transmits, in response to the first write request, a second write request to write divided multimedia information corresponding to the multimedia information to the second server module, the first server module further includes a transferring unit that transfers, based on third memory information on a buffer memory of the second server module available to store the divided multimedia information received from the second server module, the divided multimedia information to the buffer memory using remote direct memory access, and the second server module further includes a writing unit that writes the storage device with the divided multimedia information written to the buffer memory by the transferring unit.

14. The distributed multimedia server system according to claim 13, wherein the second server module includes a plurality of second server modules, and the requesting unit sequentially transmits a second read request to the second server modules.

15. The distributed multimedia server system according to claim 10, wherein the receiving unit receives a first write request to write multimedia information from a terminal, the requesting unit transmits, in response to the first write request, a second write request to write divided multimedia information corresponding to the multimedia information to the second server module, the second write request including third memory information on the buffer memory that stores the divided multimedia information, and the transferring unit reads the divided multimedia information from the buffer memory based on the third memory information to transfer the divided multimedia information to the storage device using remote direct memory access.

16. The distributed multimedia server system according to claim 15, wherein the second server module includes a plurality of second server modules, and the requesting unit sequentially transmits a second read request to the second server modules.

17. A multimedia-information distribution method that is applied to a distributed multimedia server system, in which multimedia information is divided to be stored and distributed in response to a request from a terminal, the distributed multimedia server system including a first server module, a second server module that is connected to a storage device that stores therein multimedia information in a divided manner and includes a first and second buffer memory to store divided multimedia information read from the storage device, the first server module and the second server module being connected by a local area network, and an intercluster connection network, which connects the first server module and the second server module, that allows the first server module and the second server module to mutually access each other's memories by remote direct memory access, such that the first server module and the second server module are simultaneously connected by the local area network and the intercluster connection network, the multimedia-information distribution method comprising:

receiving in the first server module a first read request for multimedia information from a terminal;

transmitting by the first server module, in response to the first read request, a second read request for first divided multimedia information corresponding to the multimedia information to the second server module using a networking protocol over the local area network;

dynamically securing by the second server module an area of the first buffer memory according to size of the first divided multimedia information requested by the second read request, reading by the second server module the first divided multimedia information from the storage device, and storing the first divided multimedia information in the first buffer memory;

transmitting by the second server module first memory information on the first buffer memory that stores the first divided multimedia information to the first server module using the networking protocol over the local area network, the first memory information including an address of a location on the first buffer memory in which the first divided multimedia information is stored and the size of the first divided multimedia information therein, the address of the location allowing access to the location to obtain the first divided multimedia information therefrom by remote direct memory access via the intercluster connection network;

obtaining by the first server module via the intercluster connection network the first divided multimedia information from the first buffer memory using remote direct memory access, based on the address of the location and the size of the first divided multimedia information included in the first memory information received from the second server module, and transmitting by the first server module, using streaming transmission, the first divided multimedia information to any one of the terminal, another terminal, and an address specified by the first read request; and reading by the second server module second divided multimedia information which is to be read next to the first divided multimedia data from the storage device, and stores the second divided multimedia information in the second buffer memory, while the first server module is obtaining and transmitting the first divided multimedia information which is read by the second server module.

18. A multimedia-information distribution method that is applied to a distributed multimedia server system, in which multimedia information is divided to be stored and distributed in response to a request from a terminal, the distributed multimedia server system including a first server module that includes a buffer memory to store divided multimedia information, a second server module that is connected to a storage device that stores therein multimedia information in a divided manner, the first server module and the second server module being connected by a local area network, and an intercluster connection network, which connects the first server module and the second server module, that allows the first server module and the second server module to mutually access each other's memories by remote direct memory access, such that the first server module and the second server module are simultaneously connected by the local area network and the intercluster connection network, the multimedia-information distribution method comprising:

receiving in the first server module a first read request for multimedia information from a terminal;

dynamically securing by the first server module, in response to the first read request, an area of the buffer memory according to size of first divided multimedia information corresponding to the multimedia information requested by the first read request, and transmitting by the first server module a second read request for the first divided multimedia information to the second server module using a networking protocol over the local area network, the second read request including memory information on the buffer memory, the memory information including an address of a location on the buffer memory in which the first divided multimedia information is to be stored and the size of the first divided multimedia information therein, the address of the location allowing access to the location to transfer the first divided multimedia information thereto by remote direct memory access via the intercluster connection network;

reading by the second server module the first divided multimedia information requested by the second read request from the storage device to transfer, via the intercluster connection network, the first divided multimedia information to the buffer memory based on the address of the location and the size of the first divided multimedia information included in the memory information using remote direct memory access;

notifying by the second server module the first server module that the first divided multimedia information has been written to the buffer memory using the networking protocol over the local area network;

transmitting by the first server module, using streaming transmission, the first divided multimedia information to any one of the terminal, another terminal, and an address specified by the first read request; and reading by the second server module second divided multimedia information which is to be read next to the first divided multimedia information from the storage device, while the first server module is transmitting the first divided multimedia information which is read by the second server module.

19. A non-transitory computer-readable recording medium encoded with a computer program that is applied to a distributed multimedia server system, in which multimedia information is divided to be stored and distributed in response to a request from a terminal, the distributed multimedia server system including a first server module, a second server module that is connected to a storage device that stores therein multimedia information in a divided manner and includes a first and second buffer memory to store divided multimedia information read from the storage device, the first server module and the second server module being connected by a local area network, and an intercluster connection network, which connects the first server module and the second server module, that allows the first server module and the second server module to mutually access each other's memories by remote direct memory access, such that the first server module and the second server module are simultaneously connected by the local area network and the intercluster connection network, the computer program causing a computer to execute:

the first server module receiving a first read request for multimedia information from a terminal;

the first server module transmitting, in response to the first read request, a second read request for first divided multimedia information corresponding to the multimedia information to the second server module using a networking protocol over the local area network;

the second server module dynamically securing an area of the first buffer memory according to size of the first divided multimedia information requested by the second read request, reading the first divided multimedia information from the storage device, and storing the first divided multimedia information in the first buffer memory;

the second server module transmitting first memory information on the first buffer memory that stores the first divided multimedia information to the first server module using the networking protocol over the local area network, the first memory information including an address of a location on the first buffer memory in which the first divided multimedia information is stored and the size of the first divided multimedia information therein, the address of the location allowing access to the location to obtain the first divided multimedia information therefrom by remote direct memory access via the intercluster connection network;

the first server module obtaining via the intercluster connection network the first divided multimedia information from the first buffer memory using remote direct memory access, based on the address of the location and the size of the first divided multimedia information included in the first memory information received from the second server module, and transmitting the first divided multimedia information, using streaming transmission, to any one of the terminal, another terminal, and an address specified by the first read request; and the second server module reading second divided multimedia information which is to be read next to the first divided multimedia data from the storage device, and stores the second divided multimedia information in the second buffer memory, while the first server module is obtaining and transmitting the first divided multimedia information which is read by the second server module.

20. A non-transitory computer-readable recording medium encoded with a computer program that is applied to a distributed multimedia server system, in which multimedia information is divided to be stored and distributed in response to a request from a terminal, the distributed multimedia server system including a first server module that includes a buffer memory to store divided multimedia information, a second server module that is connected to a storage device that stores therein multimedia information in a divided manner, the first server module and the second server module being connected by a local area network, and an intercluster connection, which connects the first server module and the second server module, network that allows the first server module and the second server module to mutually access each other's memories by remote direct memory access, such that the first server module and the second server module are simultaneously connected by the local area network and the intercluster connection network, the computer program causing a computer to execute:

the first server module receiving a first read request for multimedia information from a terminal;

the first server module dynamically securing, in response to the first read request, an area of the buffer memory according to size of first divided multimedia information corresponding to the multimedia information requested by the first read request, and transmitting a second read request for the first divided multimedia information to the second server module using a networking protocol over the local area network, the second read request including memory information on the buffer memory, the memory information including an address of a location on the buffer memory in which the first divided multimedia information is to be stored and the size of the first divided multimedia information therein, the address of the location allowing access to the location to transfer the first divided multimedia information thereto by remote direct memory access via the intercluster connection network;

the second server module reading the first divided multimedia information requested by the second read request from the storage device to transfer, via the intercluster connection network, the first divided multimedia information to the buffer memory based on the address of the location and the size of the first divided multimedia information included in the memory information using remote direct memory access;

the second server module notifying the first server module that the first divided multimedia information has been written to the buffer memory using the networking protocol over the local area network;

the first server module transmitting, using streaming transmission, the first divided multimedia information to any one of the terminal, another terminal, and an address specified by the first read request; and the second server module reading second divided multimedia information which is to be read next to the first divided multimedia information from the storage device, while the first server module is transmitting the first divided multimedia information which is read by the second server module.

* * * * *

UNITED STATES PATENT AND TRADEMARK OFFICE
CERTIFICATE OF CORRECTION

PATENT NO. : 9,002,969 B2
APPLICATION NO. : 11/632943
DATED : April 7, 2015
INVENTOR(S) : Hiroyuki Kimiyama et al.

It is certified that error appears in the above-identified patent and that said Letters Patent is hereby corrected as shown below:

On the title page, Item (54) and in the specification, Column 1, the Title is incorrect. Item (54) and Column 1 should read:

-- DISTRIBUTED MULTI-MEDIA SERVER SYSTEM, MULTI-MEDIA
INFORMATION DESTRIBUTION METHOD, PROGRAM THEREOF,
AND RECORDING MEDIUM --

On the title page, Item (86), the PCT Information is incorrect. Item (86) should read:

-- (86) PCT No.:      PCT/JP2006/309953

§ 371 (c)(1),
(2), (4) Date:      Jan. 19, 2007 --

Signed and Sealed this
Fourteenth Day of July, 2015

Michelle K. Lee
*Director of the United States Patent and Trademark Office*